US012779963B2

(12) United States Patent
Zheng et al.

(10) Patent No.: US 12,779,963 B2
(45) Date of Patent: Nov. 3, 2026

(54) TRI-FOLD SEMI-EMBEDDED COVER FOR FRONT RAIL WITH LOCKS

(71) Applicant: Yunyan He, Hangzhou (CN)

(72) Inventors: Shaoyong Zheng, Hangzhou (CN); Yunyan He, Hangzhou (CN)

(73) Assignee: Yunyan He, Hangzhou (CN)

(*) Notice: Subject to any disclaimer, the term of this patent is extended or adjusted under 35 U.S.C. 154(b) by 279 days.

(21) Appl. No.: 18/640,401

(22) Filed: Apr. 19, 2024

(65) Prior Publication Data

US 2025/0269705 A1 Aug. 28, 2025

(30) Foreign Application Priority Data

Feb. 24, 2024 (CN) ........................ 202410204643.1

(51) Int. Cl.
*B60J 7/14* (2006.01)
*B60J 7/185* (2006.01)

(52) U.S. Cl.
CPC ............... *B60J 7/141* (2013.01); *B60J 7/185* (2013.01)

(58) Field of Classification Search
CPC ... B60J 7/141; B60J 7/185; B60J 7/198; B60J 7/1204
See application file for complete search history.

(56) References Cited

U.S. PATENT DOCUMENTS 9,004,571 B1 * 4/2015 Bernardo ................. B60J 7/141 296/100.09
9,643,479 B1 * 5/2017 Zheng ...................... B60J 7/141
10,118,472 B2 * 11/2018 Lawson ................... B60J 7/141
10,322,624 B2 * 6/2019 Facchinello ............. B60J 7/106
10,960,745 B2 * 3/2021 Dylewski, II ............ B60J 7/198
11,084,361 B2 * 8/2021 Dylewski, II ........... B60R 5/047
2004/0239143 A1 * 12/2004 Marx ....................... B60J 7/062 296/100.12

(Continued)

FOREIGN PATENT DOCUMENTS

CA 2990623 A1 * 7/2018 ............ E05F 1/1292
CA 2947091 C * 7/2020 .............. B60J 7/141

(Continued)

OTHER PUBLICATIONS

Yang et al. CN 107284204, Text (Year: 2023).*

*Primary Examiner* — Karen Beck

(57) ABSTRACT

The present invention discloses a tri-fold semi-embedded cover with lock for a front bar, including a front bar, a panel body, a rotating shaft system, a locking system, a support rod system, a rear bar, and a guide rail system, there are a plurality of panels connected between the front bar and the rear bar, the two adjacent panels are connected to each other by a rotating shaft system, the rotating shaft system includes a first rotating shaft system and a second rotating shaft system, the first rotating shaft system is connected to the first rotating shaft, the second rotating shaft system is connected to the second rotating shaft, the width of the first rotating shaft is greater than or equal to the width of the second rotating shaft; the locking system is connected to the front bar and the rear bar, the locking system includes a lock bolt, the locking system is connected to a lock bolt positioning block, the locking bolt positioning block is provided to restrict the locking bolt.

21 Claims, 24 Drawing Sheets

(56) References Cited

U.S. PATENT DOCUMENTS

| | | | | |
|---|---|---|---|---|
| 2006/0267370 | A1* | 11/2006 | Wheatley | B60J 7/141 296/100.15 |
| 2007/0024079 | A1* | 2/2007 | Wheatley | B60J 7/061 296/100.16 |
| 2013/0015678 | A1* | 1/2013 | Williamson | B60J 7/1607 296/100.09 |
| 2017/0259655 | A1* | 9/2017 | Dylewski, II | B60J 7/141 |
| 2018/0147926 | A1* | 5/2018 | Shi | B60J 7/141 |
| 2019/0084388 | A1* | 3/2019 | Zheng | B60J 7/041 |
| 2020/0108702 | A1* | 4/2020 | Dylweski, II | B60J 7/198 |
| 2020/0130487 | A1* | 4/2020 | Dylewski, II | B60J 7/1858 |
| 2021/0016646 | A1* | 1/2021 | Dylewski, II | B60J 7/141 |
| 2022/0153106 | A1* | 5/2022 | Lin | B60J 10/26 |
| 2023/0356576 | A1* | 11/2023 | Dylewski, II | B60J 7/198 |
| 2024/0286471 | A1* | 8/2024 | Wang | B60J 7/141 |
| 2025/0256787 | A1* | 8/2025 | Zheng | B62D 33/044 |
| 2025/0269707 | A1* | 8/2025 | Zheng | B60J 7/198 |

FOREIGN PATENT DOCUMENTS

| | | | | | |
|---|---|---|---|---|---|
| CN | 201534517 | U | * | 7/2010 | |
| CN | 204586642 | U | * | 8/2015 | |
| CN | 205737174 | U | * | 11/2016 | |
| CN | 111645501 | A | * | 9/2020 | B60J 7/198 |
| CN | 213831300 | U | * | 7/2021 | |
| CN | 107284204 | B | * | 9/2023 | B60J 7/141 |
| CN | 108545015 | B | * | 12/2023 | B60P 7/02 |
| EP | 3081417 | B1 | * | 3/2020 | B60J 7/102 |

* cited by examiner

TRI-FOLD SEMI-EMBEDDED COVER FOR FRONT RAIL WITH LOCKS

CROSS-REFERENCE TO RELATED APPLICATIONS

The application claims priority of Chinese patent application CN202410204643.1, filed on Feb. 24, 2024, which is incorporated herein by reference in its entireties.

TECHNICAL FIELD

This invention is relevant to automotive spare parts, especially a tri-fold semi-embedded cover for front bar with lock.

BACKGROUND TECHNOLOGY

Pickup trucks have both car-like comfort and strong power, due to the pickup truck's strong ability to carry cargo and adapt to poor road surface, its comprehensive performance also makes it become one of the common off-road models nowadays.

In order to make the pickup truck to adapt to more diverse environments, most of the existing pickup trucks will be installed cover, most of the current cover is hard cover, which is divided into upright type and flat type, the cover of the flat type can not be completely open, that is, the last panel can not be turned, only two-thirds of the cover can be opened, resulting in the inconvenience of fetching and putting things, the upright car cover can be opened almost all the way, however, the upright car cover is the state of standing up after notch, and it needs to stand on the front bar, so it is necessary to ensure the stability of the connection of the front bar.

The front bar of the existing car cover pulls the car cover guide rails tightly by screws, which makes the connection more complicated.

ABOUT THE INVENTION

To overcome the deficiencies of the prior art, the present invention provides a tri-fold semi-embedded cover of a front bar with a front extension panel, by changing the connecting structure of the front bar, to solve the above problem.

In order to solve the above problems of the existing technology, the technical solution adopted in the invention is as follows:

A tri-fold semi-embedded cover with lock for a front bar, includes a front bar, a panel body (the panel body includes a large panel, a medium panel, and a small panel), a rotating shaft system, a locking system, a support rod system, a rear bar, and a guide rail system;

A plurality of panel bodies are connected between the front bar and the rear bar, the two adjacent panel bodies are connected with each other by a rotating shaft system, the rotating shaft system includes a first rotating shaft system and a second rotating shaft system, the first rotating shaft system is connected with a first rotating shaft, the second rotating shaft system is connected with a second rotating shaft, the first rotating shaft is of a width greater than or equal to the width of the second rotating shaft;

The locking system is connected to the front bar and the rear bar, the locking system includes a lock bolt, the guide rail system is connected to a lock bolt positioning block, the lock bolt positioning block is set in correspondence with the lock bolt of the front bar, the lock bolt positioning block is used for limiting the lock bolt.

The support rod system is connected to the car cover, the support rod system includes a cylindrical headstock, a support rod and a support block, the cylindrical headstock is connected to a first rotating shaft, the cylindrical headstock is connected to a ball support, the ball support is used for connecting the ball head of the support rod, the support rod system is connected to a clamp support system, the clamp support system is connected to the car body or to the guide rail system, the clamp support system is provided with a support block for fixing the support rod.

A tri-fold semi-embedded cover with lock for a front bar, including a front bar, a panel body, a rotating shaft system, a locking system, a support rod system, a rear bar, and a guide rail system;

The front bar and the rear bar are connected to a plurality of panel bodies, the two adjacent panel bodies are connected to each other by a rotating shaft system, the rotating shaft system includes a first rotating shaft system and a second rotating shaft system, the first rotating shaft system is connected to a first rotating shaft, the second rotating shaft system is connected to a second rotating shaft, the first rotating shaft is of a width greater than or equal to the width of the second rotating shaft;

The locking system is connected to a front bar and a rear bar, the locking system includes a lock bolt and a steel wire, each end of the steel wire is connected to a lock bolt, the guide rail system is connected to a lock bolt positioning block, the lock bolt positioning block is set in correspondence with the lock bolt of the front bar, the lock bolt positioning block is used for limiting the lock bolt;

The guide rail system includes a guide rail, the guide rail is provided with a guide rail groove, the support rod system is connected to the car cover, the support rod system includes a cylindrical headstock, a support rod and a support block, the support block is provided with a support protrusion, the support protrusion is inserted into the guide rail groove, the cylindrical headstock is connected to a large rotating shaft, the cylindrical headstock is connected to a ball support, the ball support is used for connecting the ball head of the support rod, the support block is used for connecting the other end of the support rod.

A tri-fold semi-embedded cover with lock for a front bar, includes a front bar, a panel body, a rotating shaft system, a locking system, a support rod system, a rear bar, and a guide rail system;

The front bar and the rear bar are connected to a plurality of panel bodies, the two adjacent panel bodies are connected to each other by a rotating shaft system, the rotating shaft system includes a first rotating shaft system and a second rotating shaft system, the first rotating shaft system is connected to a first rotating shaft, the second rotating shaft system is connected to a second rotating shaft, the first rotating shaft is of a width greater than or equal to the width of the second rotating shaft;

The locking system is connected to the front bar and the rear bar, the locking system includes a lock bolt, the guide rail system is connected to a lock bolt positioning block, the guide rail system is connected with two sets of lock bolt positioning blocks, one set of which is located at the rear side of the lock bolt on the front bar, the other set of which is located at the front side of the lock bolt on the rear bar, the lock bolt positioning blocks are used for limiting the lock bolt;

The support rod system is connected to the car cover, the support rod system includes a cylindrical headstock and a support rod, the cylindrical headstock is connected to a first rotating shaft, the cylindrical headstock is connected to a ball support, the ball support is used for connecting the ball head of the support rod, the support rod system is connected to a clamp support system, the clamp support system is connected to the car body and the guide system, the clamp support system is provided with a support block for fixing the support rod, the cylindrical headstock is provided with a horizontal surface.

A tri-fold semi-embedded cover with lock for a front bar, including a front bar, a panel body, a rotating shaft system, a locking system, a support rod system, a rear bar, and a guide rail system;

The front bar and the rear bar are connected to a plurality of panel bodies, the two adjacent panel bodies are connected to each other by a rotating shaft system, the rotating shaft system includes a first rotating shaft system and a second rotating shaft system, the first rotating shaft system is connected to a first rotating shaft, the second rotating shaft system is connected to a second rotating shaft, the first rotating shaft is of a width greater than or equal to the width of the second rotating shaft;

The locking system is connected to the front bar and the rear bar, the locking system includes a lock bolt, the guide rail system is connected to a lock bolt positioning block, the lock bolt positioning block is set in correspondence with the lock bolt of the front bar, the lock bolt positioning block is used for limiting the lock bolt;

The guide rail system includes a guide rail, the guide rail is connected to a lock bolt base, the guide rail is provided with a guide rail hook, the guide rail hook is used for matting with the lock bolt base, the lock bolt base is provided with a cylindrical lock buckle, the cylindrical lock bolt is provided with a base adjusting hole, the base adjusting hole is provided with an upper and a lower connecting adjusting port, the base adjusting hole is used for adjusting the position of the lock bolt base.

Further, the support rod system includes a cylindrical head seat, a support rod, a ball head, a ball support, a first cylinder, a second cylinder and a bottom cap;

The cylindrical headstock is provided with a protruding head, a fixing threaded hole and a cylindrical headstock fixing hole, the fixing threaded hole and the cylindrical headstock fixing hole are arranged vertically to each other, a screw connects the cylindrical headstock to the first rotating shaft through the cylindrical headstock fixing hole, the fixing threaded holes are connected to a ball support, the ball support is connected to a ball head;

One end of the support rod is connected to the ball head, the other end of the support rod is connected to a half-waist hole of the support block, the support rod is provided with a support rod thread, the support rod is threadedly connected to a first cylinder and a second cylinder, the end of the support rod is connected to a bottom cap. The bottom cap is used to prevent the end of the support rod from scratching the fingers, the half-waist hole on the support block is clamped by adjusting the distance between the first cylinder and the second cylinder to fix the support rod, the support rod is provided with a support step for blocking the first cylinder.

Further, the support block is fixed to a clamp support system, the clamp support system includes a T-rod, a plum nut, a screw, a left clamp and a right clamp, the left clamp includes a left clamp groove and a left clamping surface, the right clamp includes a right clamping surface;

The left clamp and the right clamp are connected to each other by means of a screw and a T-rod, the T-rod is connected to a plum nut.

The support block is provided with a support bevelled surface, a support screw hole and a support protrusion, the support protrusion is connected to the left clamp groove, the screw is connected to the left clamp through the support screw hole, the support bevelled surface is used to support the support rod, the left clamping surface is matted to the right clamping surface.

The left and right clamps can be clamped to the car body directly or to clamped the guide rail together with the car body, when the left and right clamps clamp the car body only, the guide rail has to provide a guide rail notch.

Further, the support block is connected to the guide rail, the support block is provided with a support protrusion and a support bevelled surface, the support protrusion is connected to the guide rail groove, the support bevelled surface is used to support the support rod, so as to form a triangular fixation of the support rod and the car cover Further, the cylindrical headstock is provided with a horizontal surface and a fixing threaded opening, the horizontal surface is in parallel with the bottom surface of the large rotating shaft, the fixing threaded opening is used to connect a ball support, the ball support is used to fix the support rod.

Further, the rear bar includes a rear bar joint, a rear bar profile and a rear bar rubber strip, the rear bar joint is connected to the lower side of the rear bar profile, the rear bar joint is connected to the rear bar rubber strip, the rear bar profile is provided with a positioning protrusion and a gluing section, the rear bar rubber strip is provided with a cavity, a rubber strip protrusion and a gluing section, the rubber strip protrusion is provided in cooperation with the positioning protrusion, the gluing section is boned to the gluing section.

Further, the first rotating shaft system includes a large joint, a joint, a small joint, a large rotating shaft, a first rotating shaft, a first rotating shaft rubber strip, a second rotating shaft rubber strip, and a small rotating shaft;

The large rotating shaft is connected to the first rotating shaft by the first rotating shaft rubber strip, the first rotating shaft is connected to the small rotating shaft by the second rotating shaft rubber strip, the second rotating shaft rubber strip includes a rubber strip clamping foot, the rubber strip clamping foot is clamped to the large rotating shaft groove, the large rotating shaft, the first rotating shaft, the small rotating shaft, the first rotating shaft rubber strip, the second rotating shaft rubber strip form a rotating shaft system, the two ends of the rotating shaft system are connected with a large joint, a joint, and a small joint, the large rotating shaft is provided with a panel notch, a locking groove, a large rotating shaft groove and a steel wire, the panel notch is used for connecting the panel, the locking groove is used for connecting the locking system, the large rotating shaft groove is plugged with a steel wire. The steel wire compressed against the rubber strip jaws provides a waterproofing effect. The joint is provided with a gluing port and a gluing step, the gluing step is bonded to the front of rubber strip with glue, the first rotating shaft rubber strip passes through the gluing port. The two ends of the first rotating shaft rubber strip are nearly aligned with the ends of the plurality of joints after bonding, which increases the aesthetics and the waterproof performance.

Further, the second rotating shaft system includes a first rotating shaft small joint, a rotating shaft joint, a second rotating shaft small joint, a first small rotating shaft, a second rotating shaft, a third rotating shaft rubber strip, a fourth rotating shaft rubber strip, and a second small rotating shaft;

The first small rotating shaft is connected to the second rotating shaft through the third rotating shaft rubber strip, the second rotating shaft is connected to the second small rotating shaft through the fourth rotating shaft rubber strip, the first small rotating shaft, the second rotating shaft, the second small rotating shaft, the third rotating shaft rubber strip, and the fourth rotating shaft rubber strip form a rotating shaft system, the two ends of the rotating shaft system are both connected with a first rotating shaft small joint, a rotating shaft joint, and a second rotating shaft small joint;

The first small rotating shaft is provided with a panel notch, a screw hole, a round hook protrusion, a small rotating shaft groove, a gluing groove and a small rotating shaft round hook, the panel notch is used for connecting the panel, the screw hole is used for connecting the second rotating shaft small joint, the small rotating shaft groove is used for snapping in place with the rubber strip hook, the small rotating shaft groove is connected with a steel wire, the gluing groove is used for applying the glue;

The second rotating shaft is provided with a central shaft, an annular channel and a rotating shaft fixing hole, the small rotating shaft round hook is rotationally mated with the central shaft, the annular channel is rotationally mated with the central shaft, the annular channel is a rotational channel for the small rotating shaft round hook, the rotating shaft fixing hole is used for connecting a rotating shaft joint, the round hook protrusion is used for hooking the central shaft;

The third rotating shaft rubber strip is provided with a concave bottom surface, a convex surface and a flange bottom, the second rotating shaft is provided with a small plane, the small plane is bonded with the flange bottom by glue, the concave bottom surface and the convex surface are provided in correspondence with each other. The convex surface is aimed at counteracting the concave bottom surface, which makes the rubber strip thinner to cause a strength risk.

Further, the front bar includes a pad, a supporting seat, a first profile, a second profile, a large front bar joint, a small front bar joint, a front bar rubber strip and a connecting rod;

The pad is connected to the supporting seat, the pad is in the shape of a step, the supporting seat is symmetrically arranged on the first profile, the first profile and the second profile form a large front bar, the large front bar is connected to a connecting rod, a front bar rubber strip is provided between the large front bar and the connecting rod, the large front bar, the front bar rubber strip and the connecting rod form a front bar system, a large front bar joint and a small front bar joint are connected at both ends of the front bar system;

The second profile is provided with a round hook, a profile groove, a rubber strip plane and a profile notch, the first profile is provided with a snap-in head, a gluing concave and a processing groove, the processing groove is provided with a locking system, the front bar rubber strip includes a rubber strip flange and a rubber strip plug, the profile notch is mated with the snap-in head, the gluing concave is used for sealant, the rubber strip plane is used for mating with the rubber strip plug, the rubber strip flange is connected with the rubber strip plane.

The connecting rod includes a connecting rod rotating shaft, the connecting rod rotating shaft is rotatingly mated with a round hook at an angle of rotation of less than 95°.

Further, the guide rail system includes a lock bolt positioning block, a first guide rail rubber strip, a second guide rail rubber strip, a guide rail clamp, a guide rail, and a third guide rail rubber strip;

The lock bolt positioning block is connected to the end of the guide rail head, the guide rail includes a guide rail groove, a covering plane and a guide rail supporting surface, the guide rail supporting surface is used to support the car cover, the covering plane covers the surface of the car body, the guide rail groove is used for connecting the lock bolt positioning block and the guide rail clamp, the first guide rail rubber strip is provided on the backside of the guide rail, the second guide rail rubber strip is connected to the covering plane, the third guide rail rubber strip is connected to the guide rail supporting surface.

The lock bolt locating block includes a locating block groove, a positioning block screw hole and a locating block protrusion, the positioning block protrusion is connected to the guide rail groove, the lock bolt locating block is connected to the guide rail through the locating block screw hole, the positioning block groove is used for limiting the position of the lock bolt.

The guide rail is provided with a guide rail notch.

Further, the guide rail system includes a guide rail, a lock bolt base, a guide rail lock bolt positioning block and a cylindrical lock bolt;

The guide rail includes a guide rail groove and a guide rail hook;

The cylindrical lock bolt is provided with a locking cylindrical head, a cylindrical head plane and a base adjustment hole;

The guide rail lock bolt positioning block includes a positioning block fixing hole and a lock bolt blocking surface;

The lock bolt base is provided with a base screw hole, a base protrusion and a base barb;

The cylindrical lock bolt head is mated with the lock bolt, the lock bolt base is connected to the guide rail lock bolt positioning block through the positioning block fixing holes, the cylindrical head plane is used to avoid interference of the car cover, the base screw holes fix the lock bolt base to the guide rail, the base protrusion snaps together with the guide rail groove, the base barbs are used to hold the guide rail hooks, preventing the lock bolt base from gaping with the guide rail and resulting in tilting of the cylindrical lock bolt.

Further, the guide rail is provided with a guide rail notch, the clamp support system is connected to the car body, the clamp support system is located in the guide rail notch.

Further, the clamp support system is connected to the car body and the guide rail, the guide rail is provided with a guide rail notch, the clamp support system includes a right clamp and a left clamp, the left clamp is provided with a left clamping surface, the left clamping surface extends into the guide rail groove.

Further, the cylindrical headstock and the ball support are either of one-piece structure or split structure.

Further, the front bar is provided with a pad, the pad is provided with a bearing surface and a blocking surface, the bearing surface is used to support the car cover. When the cover is folded vertically, it can be supported on the blocking surface, the rotating shaft joint on the cover is blocked by the bearing surface so that the cover is fixed within the space formed by the pads.

Further, the pads are fixed to a supporting seat. The support base is a high-strength material that can be used as a socket and as an exoskeleton for the pads to strengthen the pads, the first and second rotating shaft systems are connected to a locking system, both ends of the first and second profiles are connected with a large front bar joint, the front bar joint is provided with a first plug, a second plug and a third plug, the first profile is provided with a first insertion hole and a second insertion hole, the second profile is provided with a third insertion hole, the first plug is provided in correspondence with the first insertion hole, the second plug is provided in correspondence with the second insertion hole, the third plug is provided in correspondence with the third insertion hole. Thereby the first and second profiles can be locked between the two large front bar joints, which are screwed together in addition to being plugged in.

The beneficial effects of the present invention are:

1. The present invention by changing the connection structure of the front bar, using the lock bolt to connect the front bar, which makes the opening and closing of the front bar more convenient, and setting up the lock bolt positioning block, using the positioning block to limit the lock bolt, so as to ensure the stability of the connection of the lock bolt.
2. The rotating shaft structure in the present invention adopts a multiple waterproof structure, which is good at waterproofing.

Figure 1:
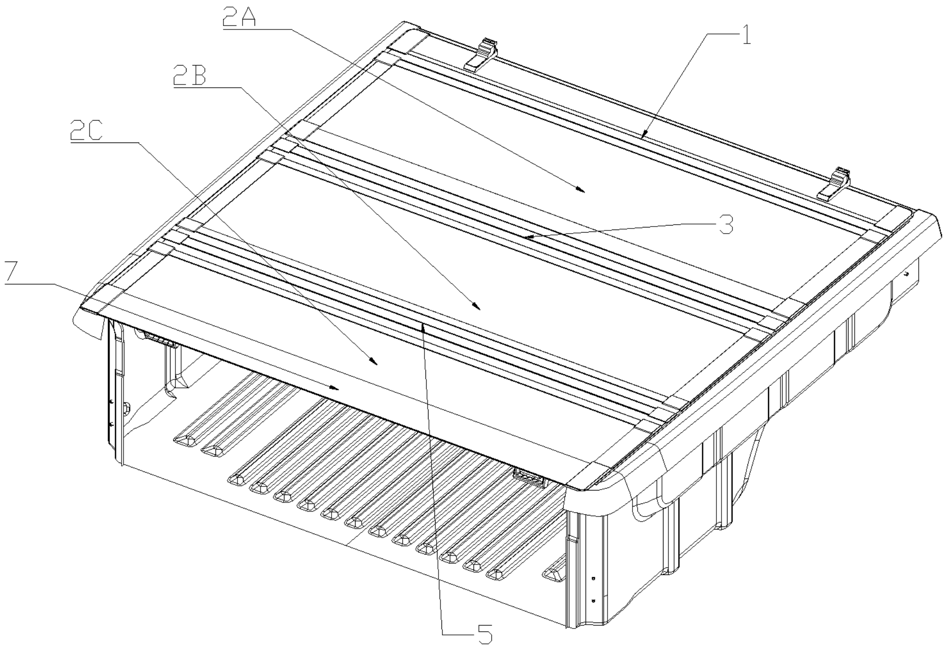
FIG. 1 is an usage schematic diagram I of the present invention.
Figure 2:
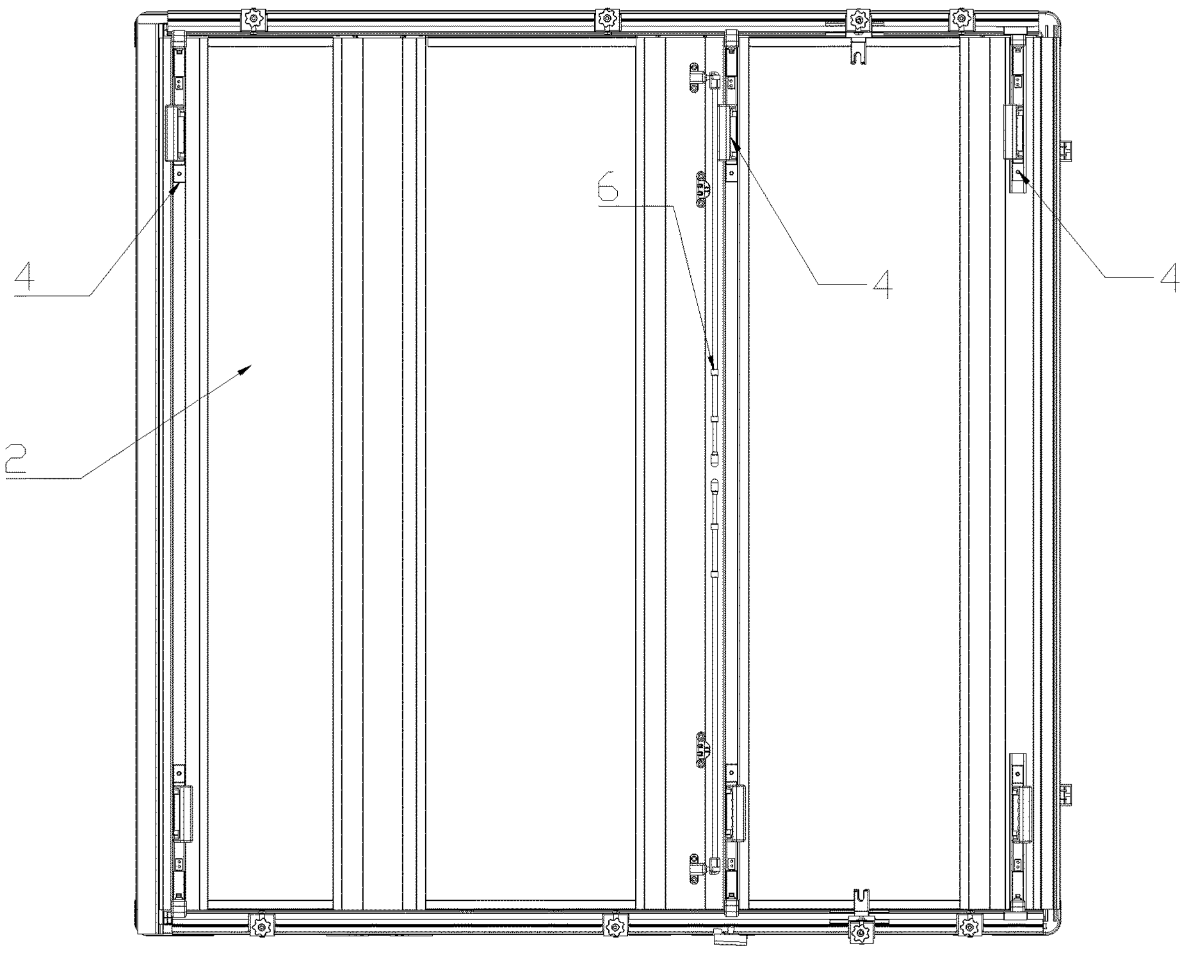
FIG. 2 is a structural schematic diagram I of the present invention.
Figure 3:
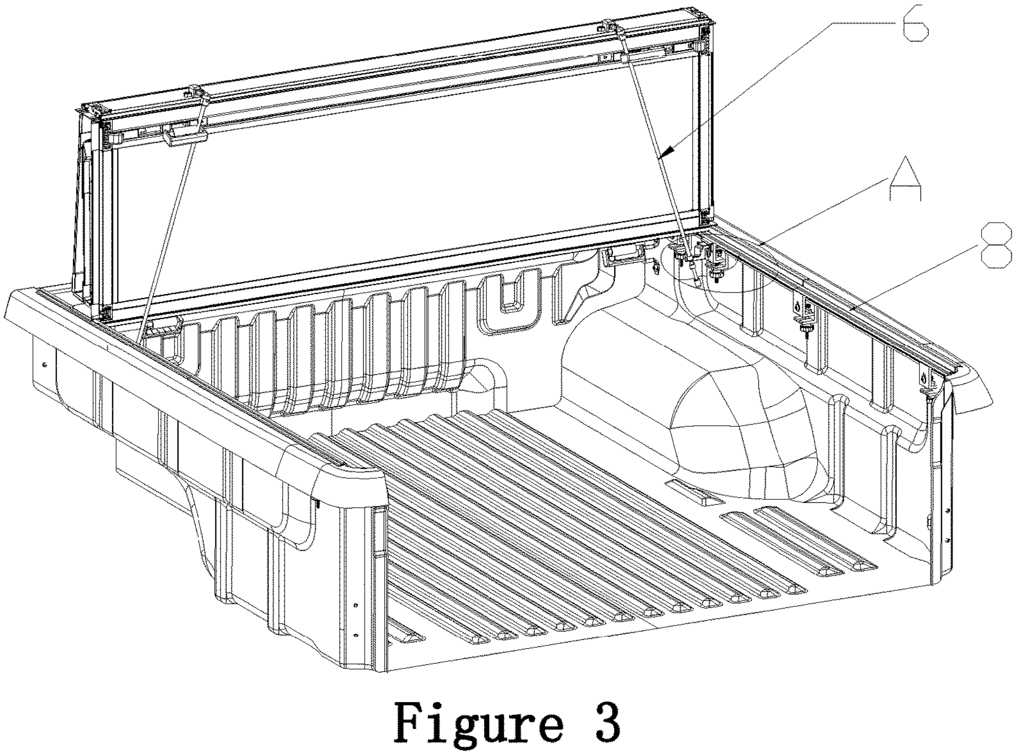
FIG. 3 is an usage schematic diagram II of the present invention.
Figure 4:
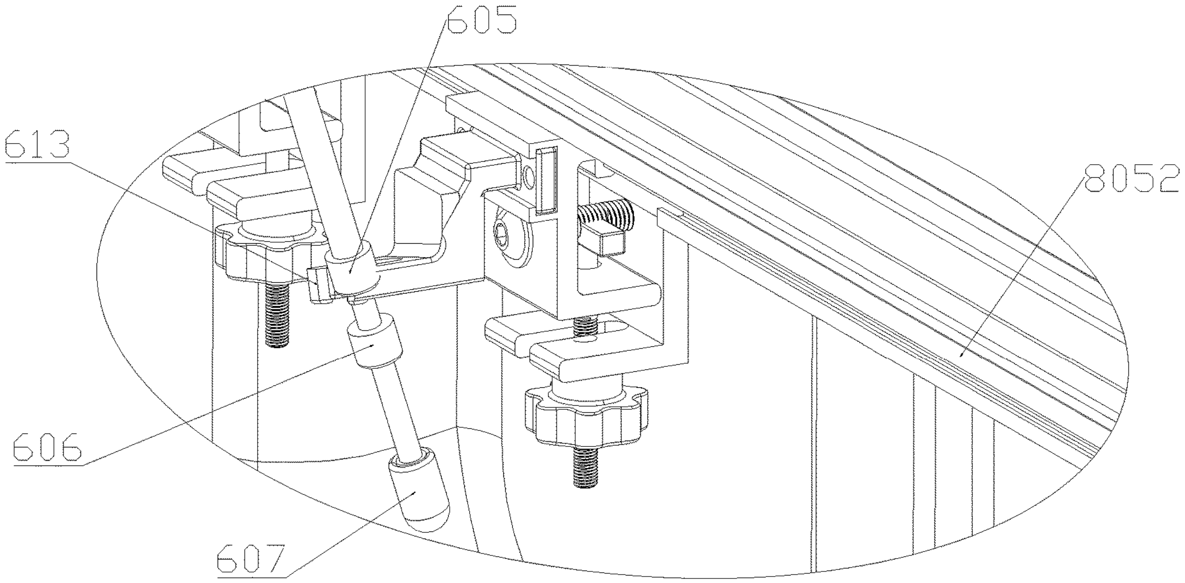
FIG. 4 is a structural schematic diagram of part A in FIG. 3.
Figure 5:
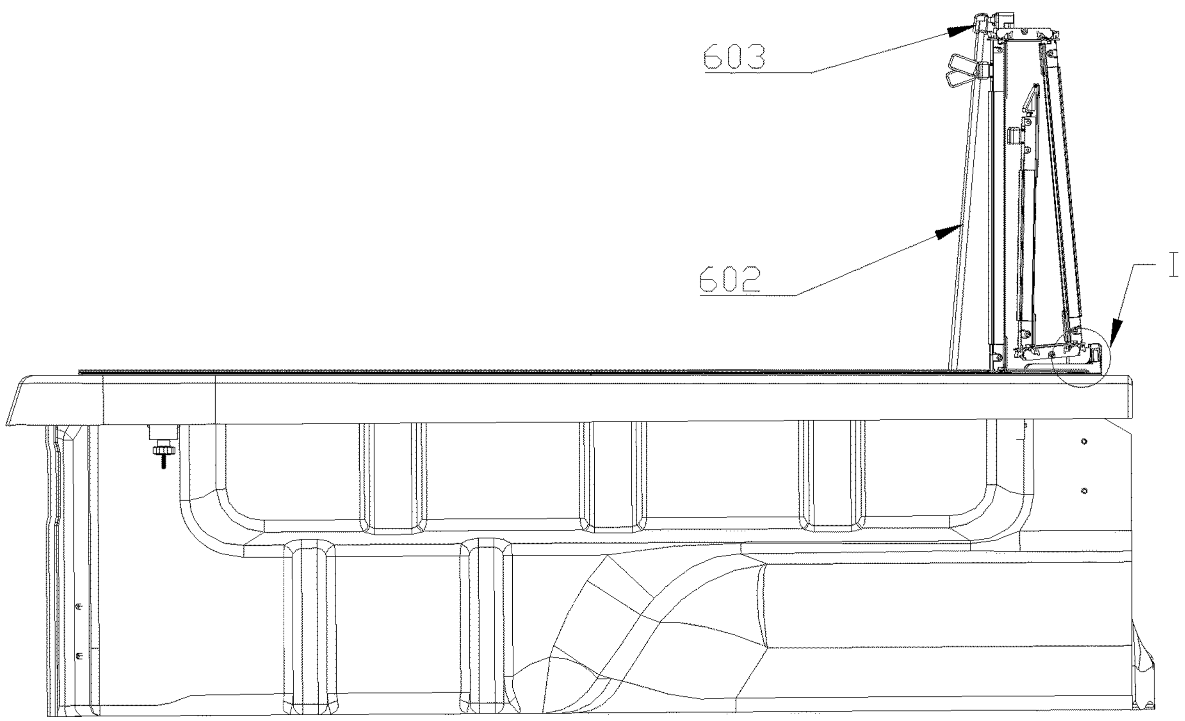
FIG. 5 is an usage schematic diagram III of the present invention.
Figure 6:
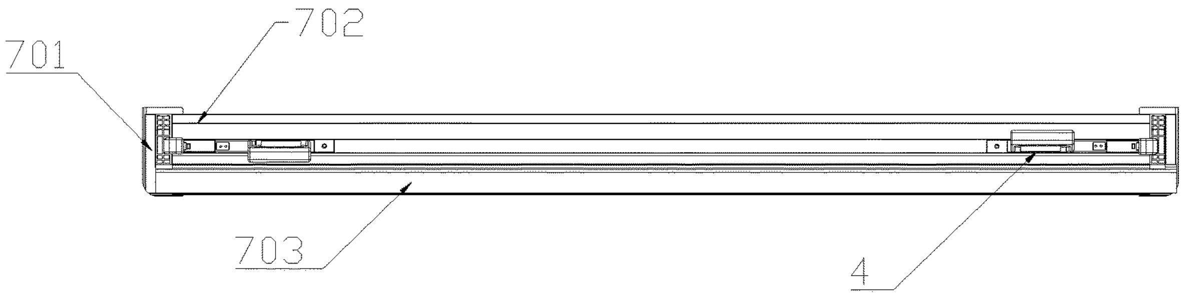
FIG. 6 is a structural schematic diagram I of the rear bar of the car cover.
Figure 7:
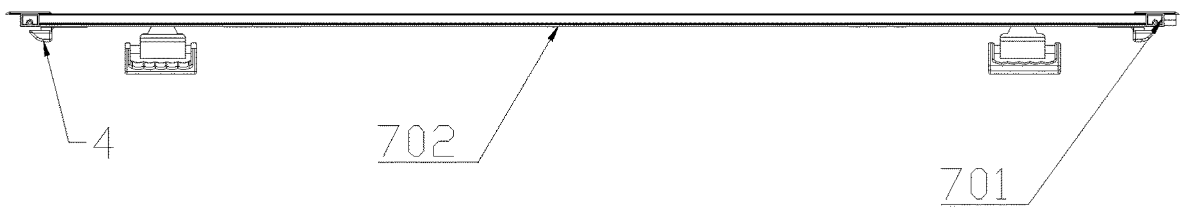
FIG. 7 is a structural schematic diagram II of the rear bar of the car cover.
Figure 8:
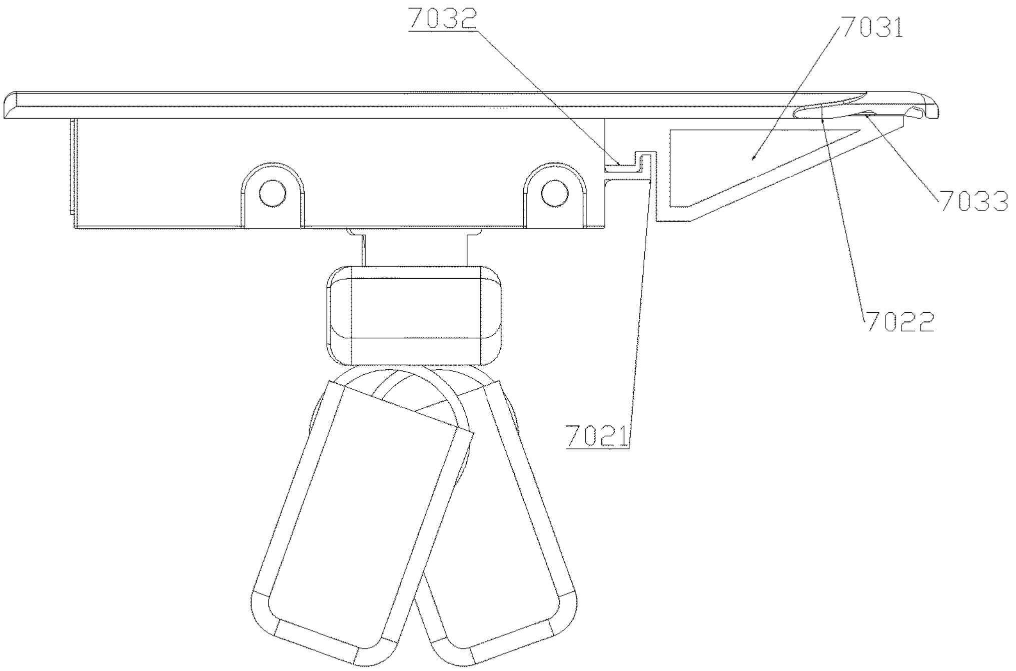
FIG. 8 is a structural schematic diagram III of the rear bar of the car cover.
Figure 9:
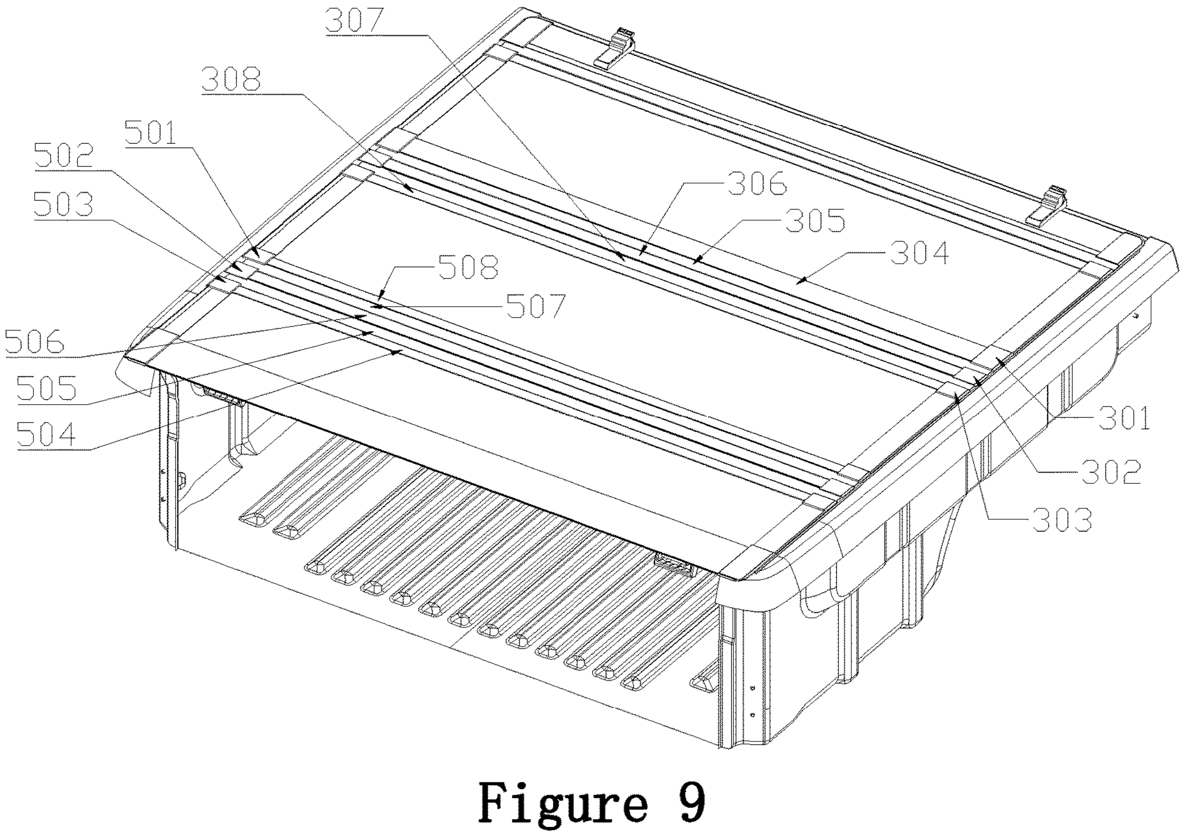
FIG. 9 is an usage schematic diagram IV of the use of the present invention.
Figure 10:
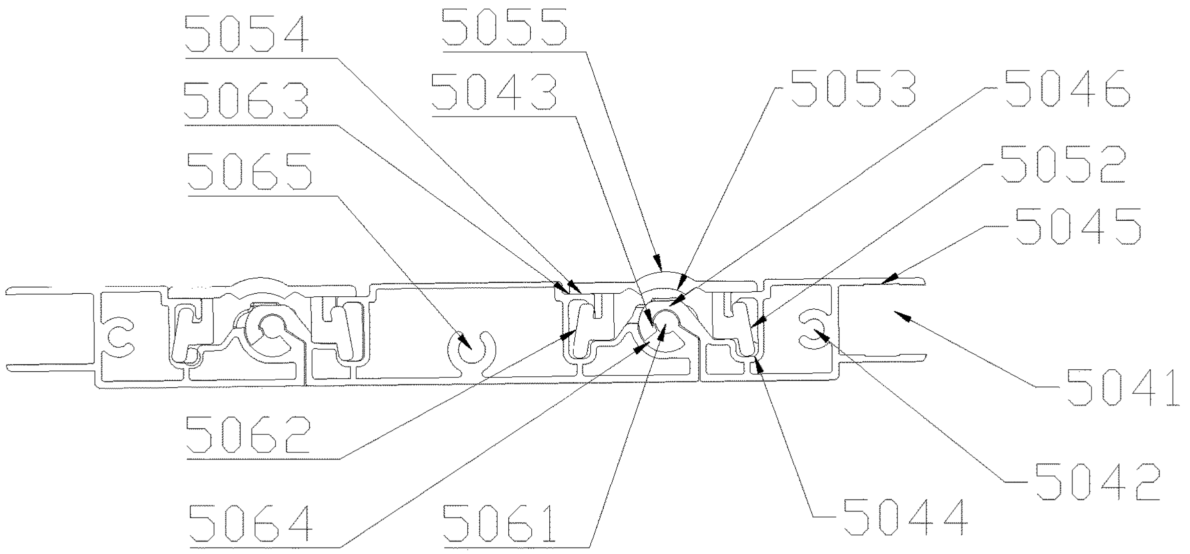
FIG. 10 is a structural schematic diagram I of the intermediate bar.
Figure 11:
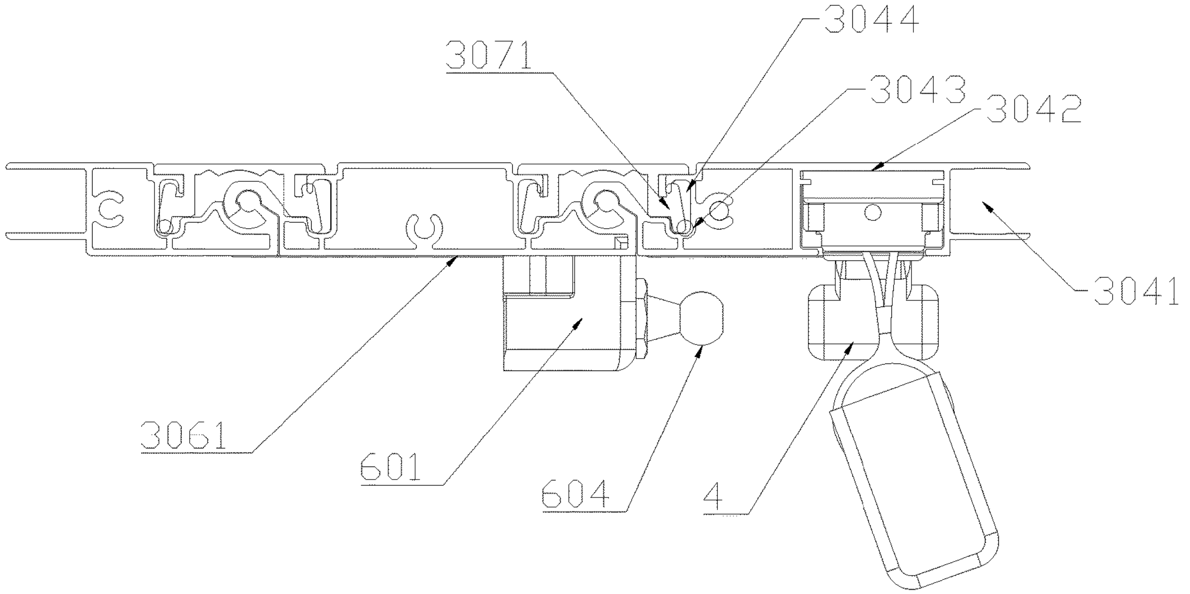
FIG. 11 is a structural schematic diagram II of the intermediate bar.
Figure 12:
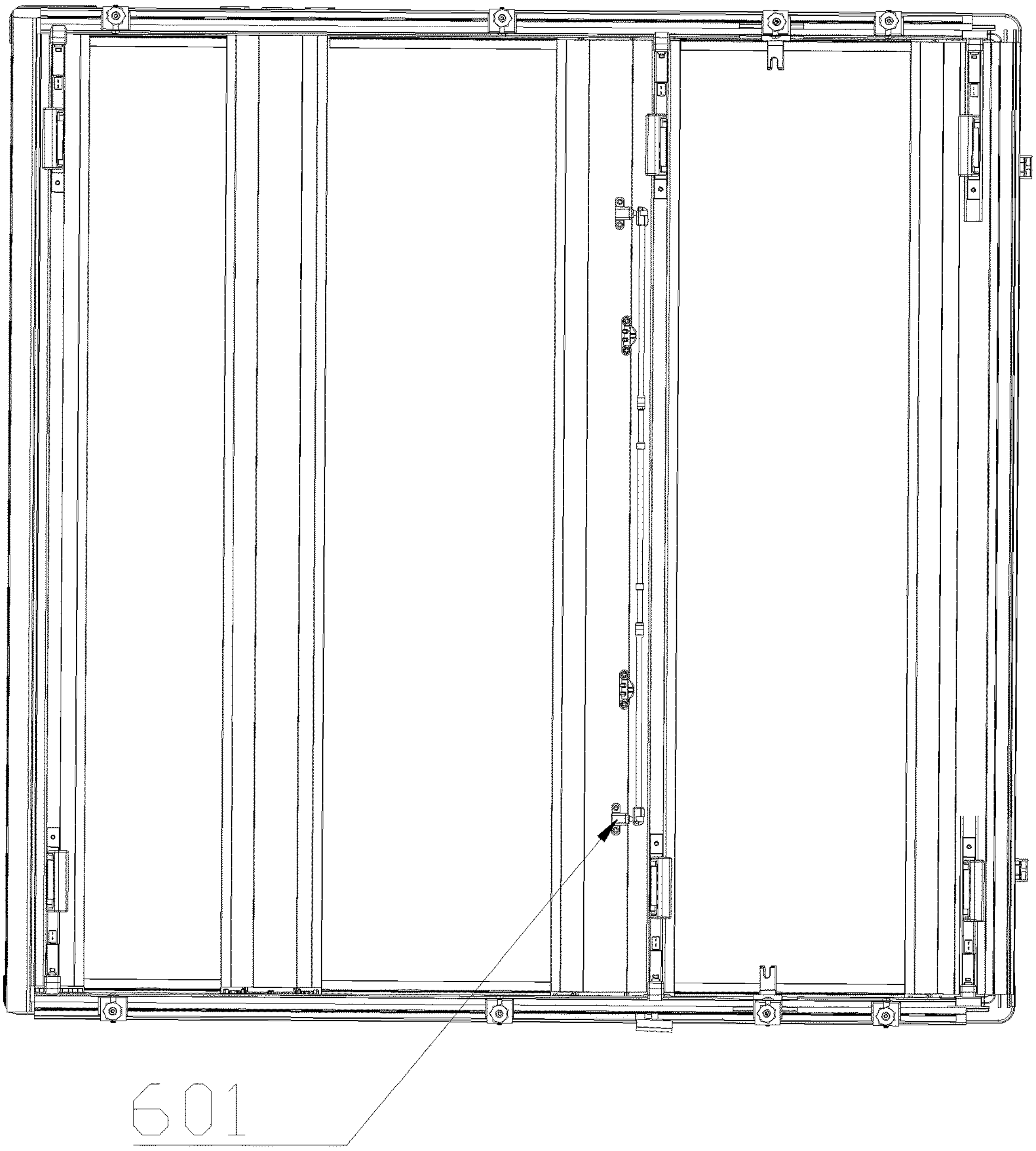
FIG. 12 is a structural schematic diagram II of the present invention.
Figure 13:
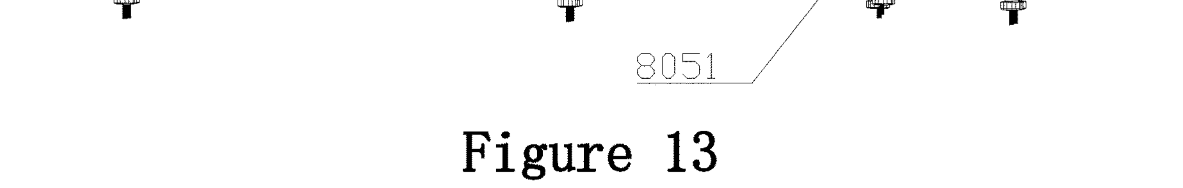
FIG. 13 is a structural schematic diagram III of the present invention.
Figure 14:
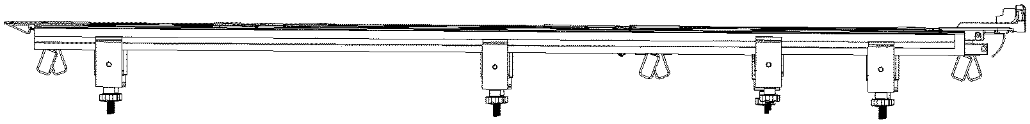
FIG. 14 is a structural schematic diagram IV of the present invention.
Figure 15:
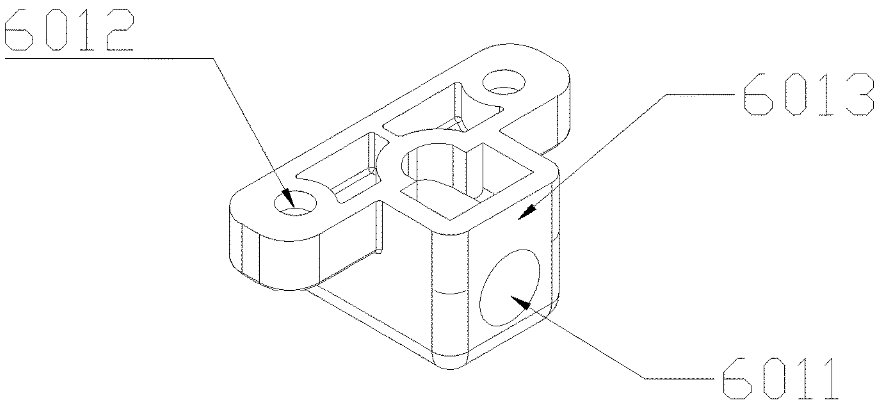
FIG. 15 is a structural schematic diagram of the cylindrical headstock I of the present invention.
Figure 16:
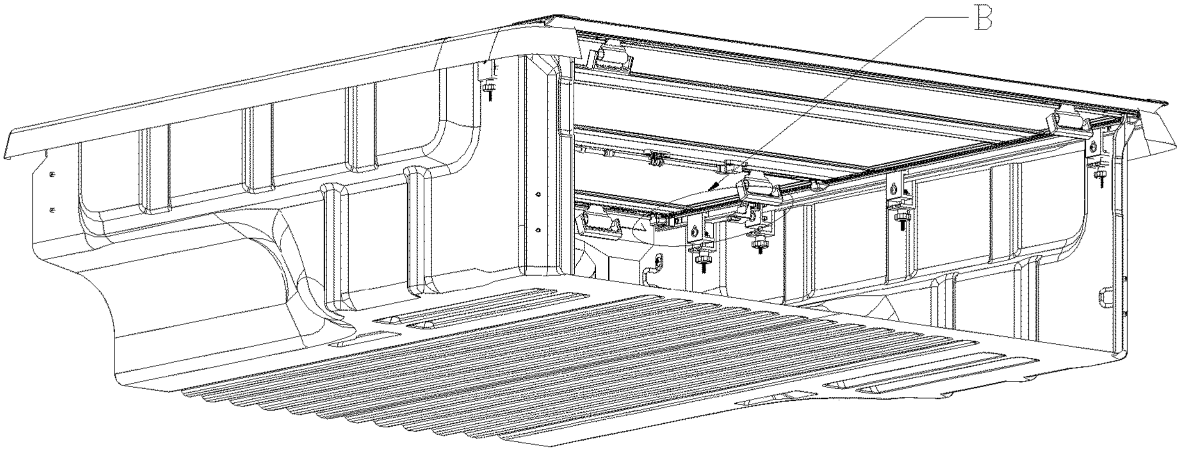
FIG. 16 is an usage schematic diagram V of the present invention.
Figure 17:
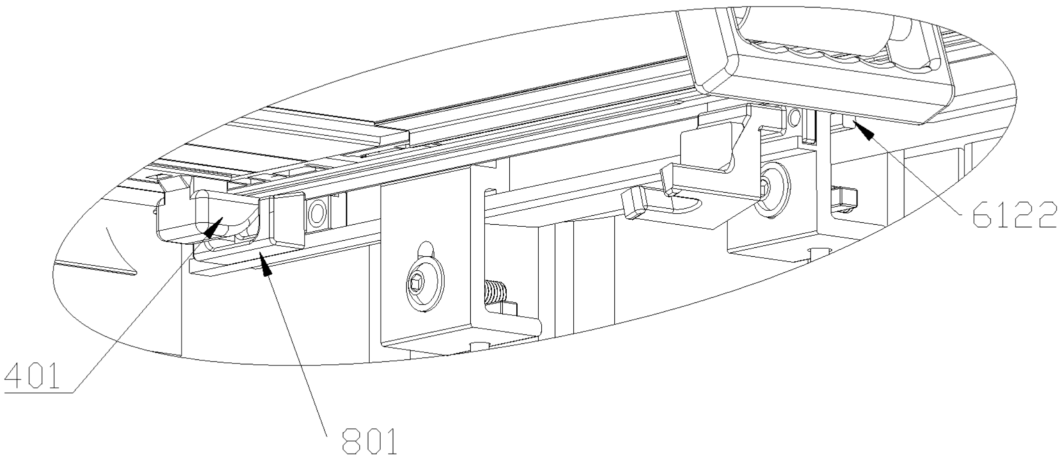
FIG. 17 is a partially enlarged view of part B in FIG. 16.
Figure 18:
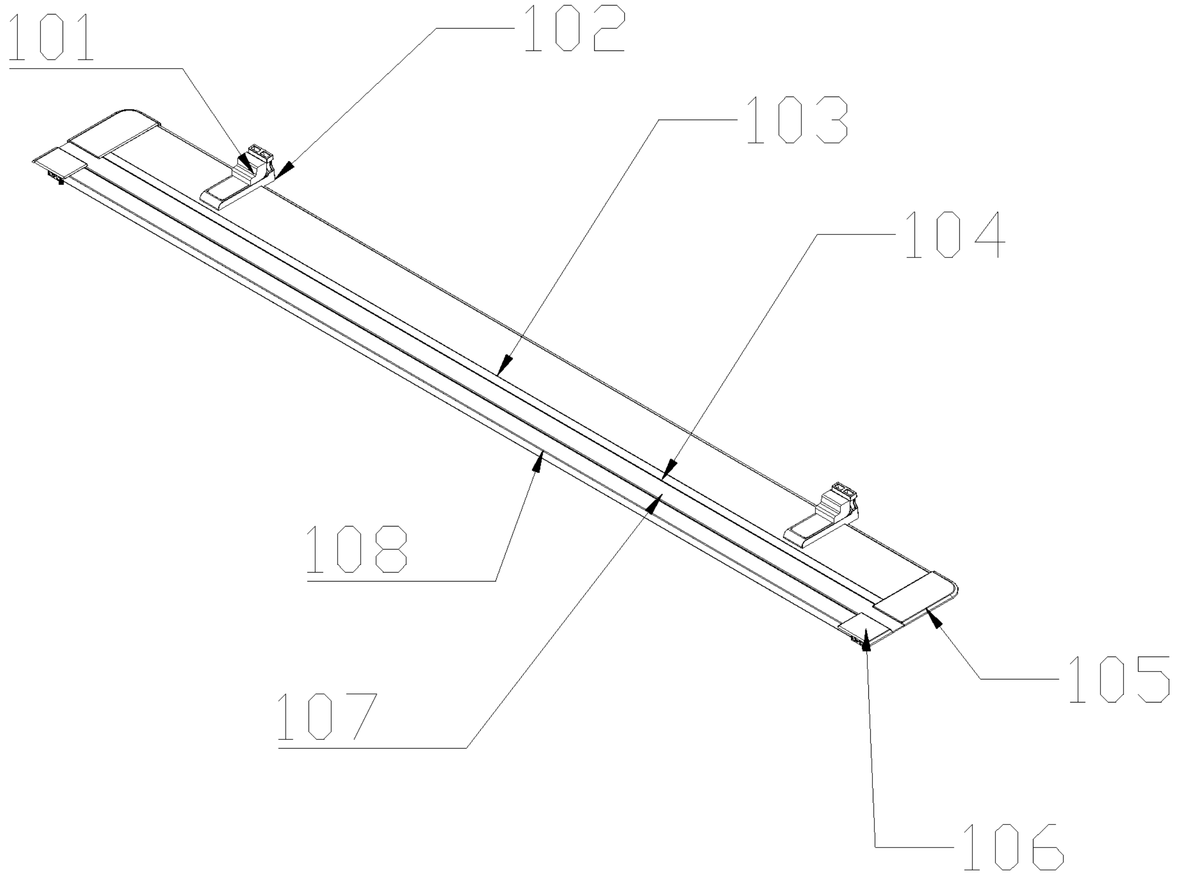
FIG. 18 is a structural schematic diagram of the front bar in the present invention.
Figure 19:
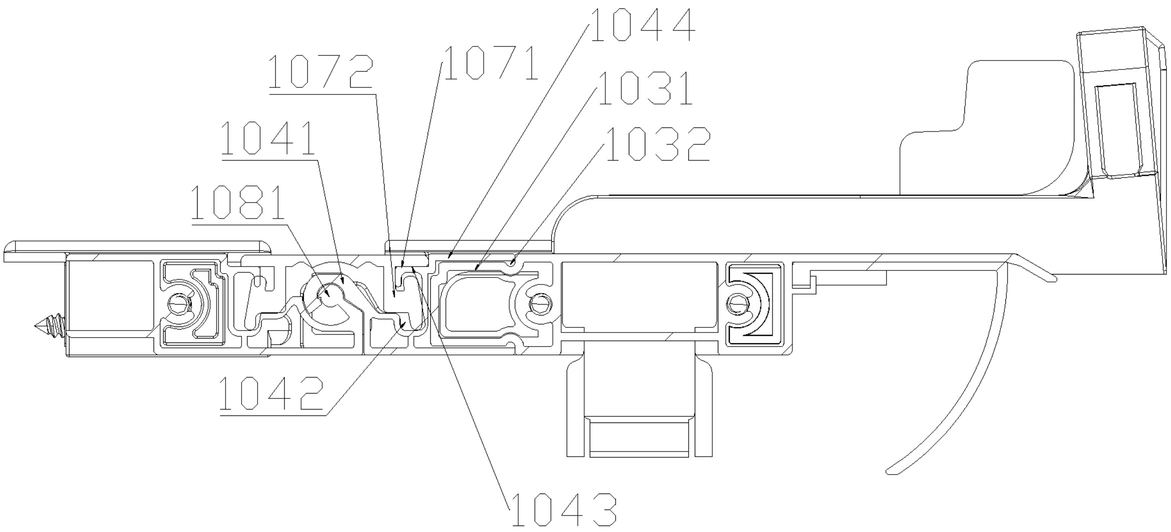
FIG. 19 is a cross-sectional schematic diagram of the front bar in the present invention.
Figure 20:
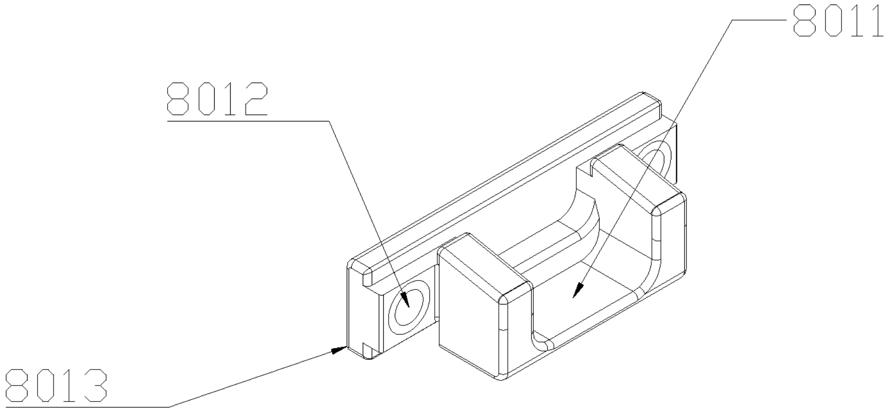
FIG. 20 is a structural schematic diagram I of a lock bolt positioning block in the present invention.
Figure 21:
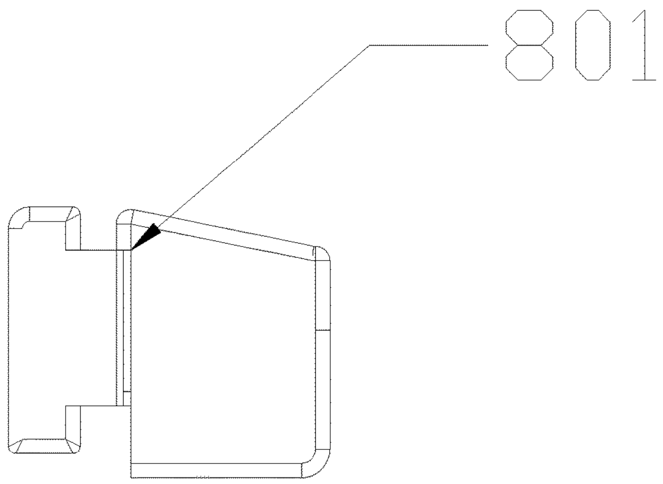
FIG. 21 is a structural schematic diagram II of the lock bolt positioning block in the present invention.
Figure 22:
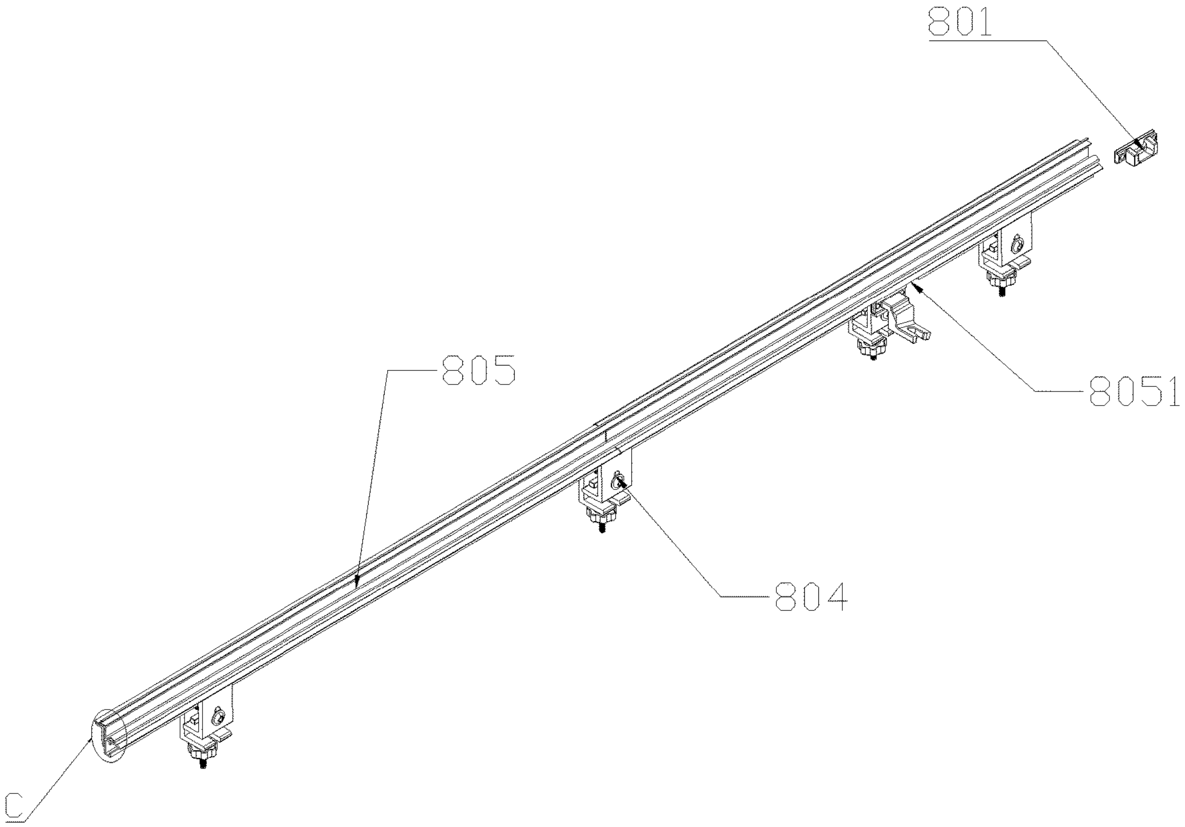
FIG. 22 is a connection schematic diagram of the guide rail in the present invention.
Figure 23:
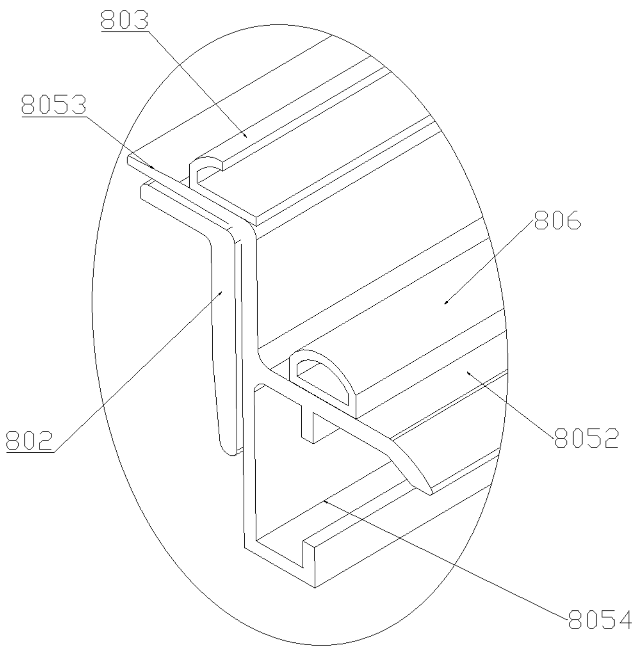
FIG. 23 is a partially enlarged view of part C in FIG. 22.
Figure 24:
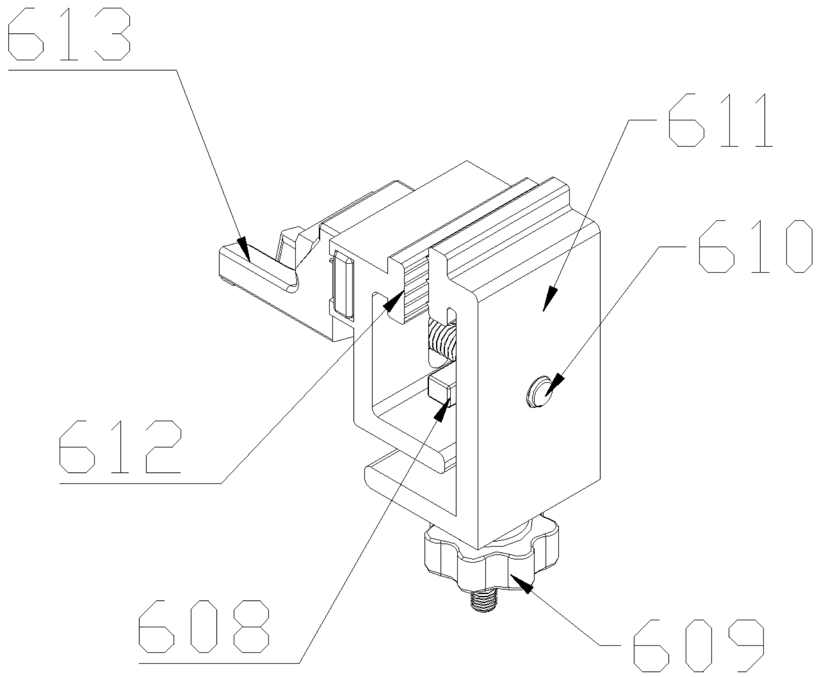
FIG. 24 is a structural schematic diagram I of the support clamp.
Figure 25:
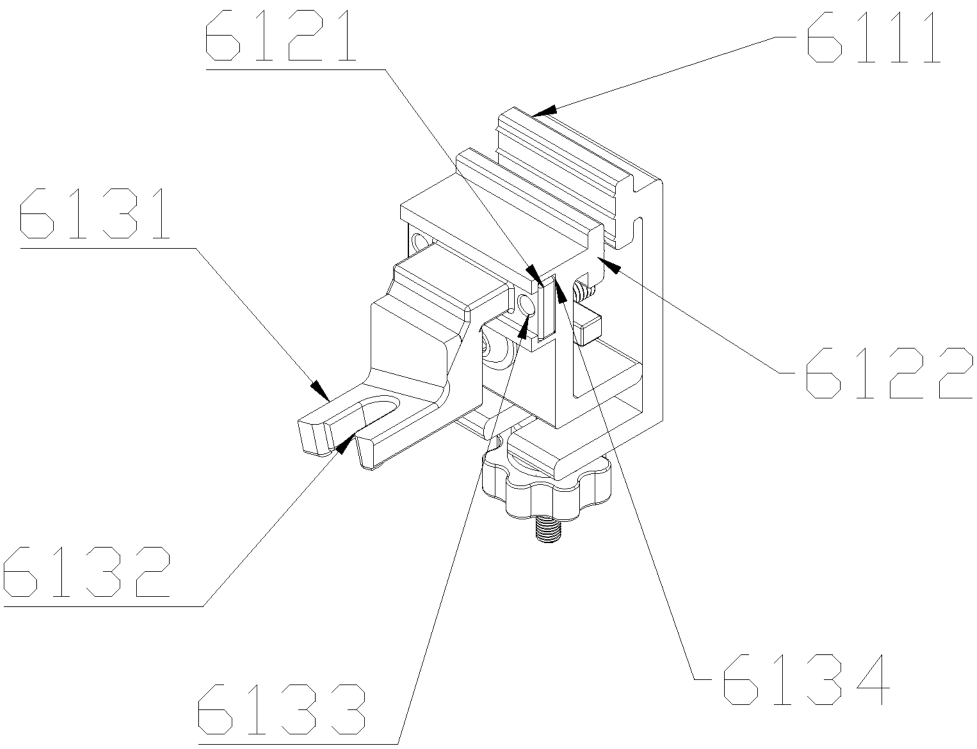
FIG. 25 is a structural schematic diagram II of the support clamp.
Figure 26:
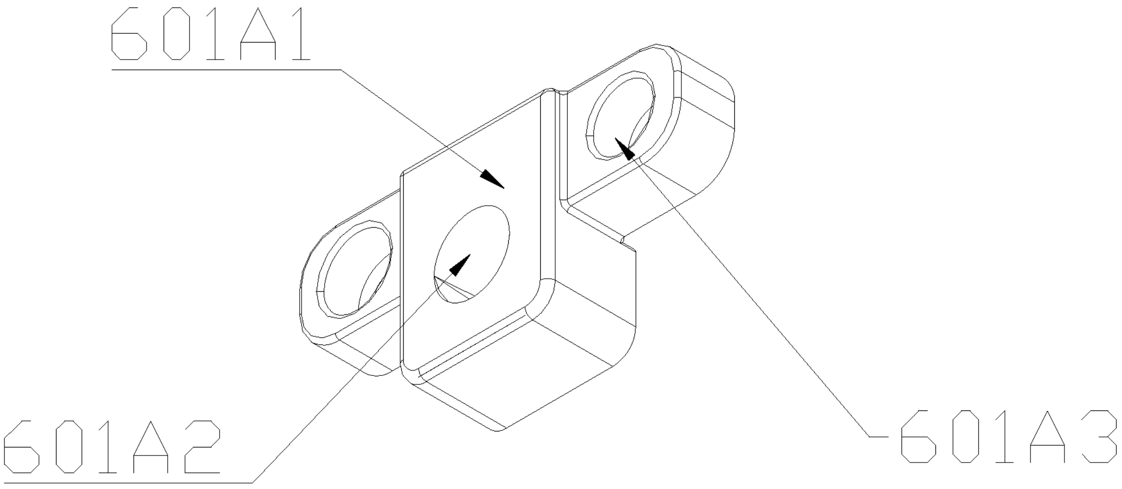
FIG. 26 is a structural schematic diagram II of a cylindrical headstock.
Figure 27:
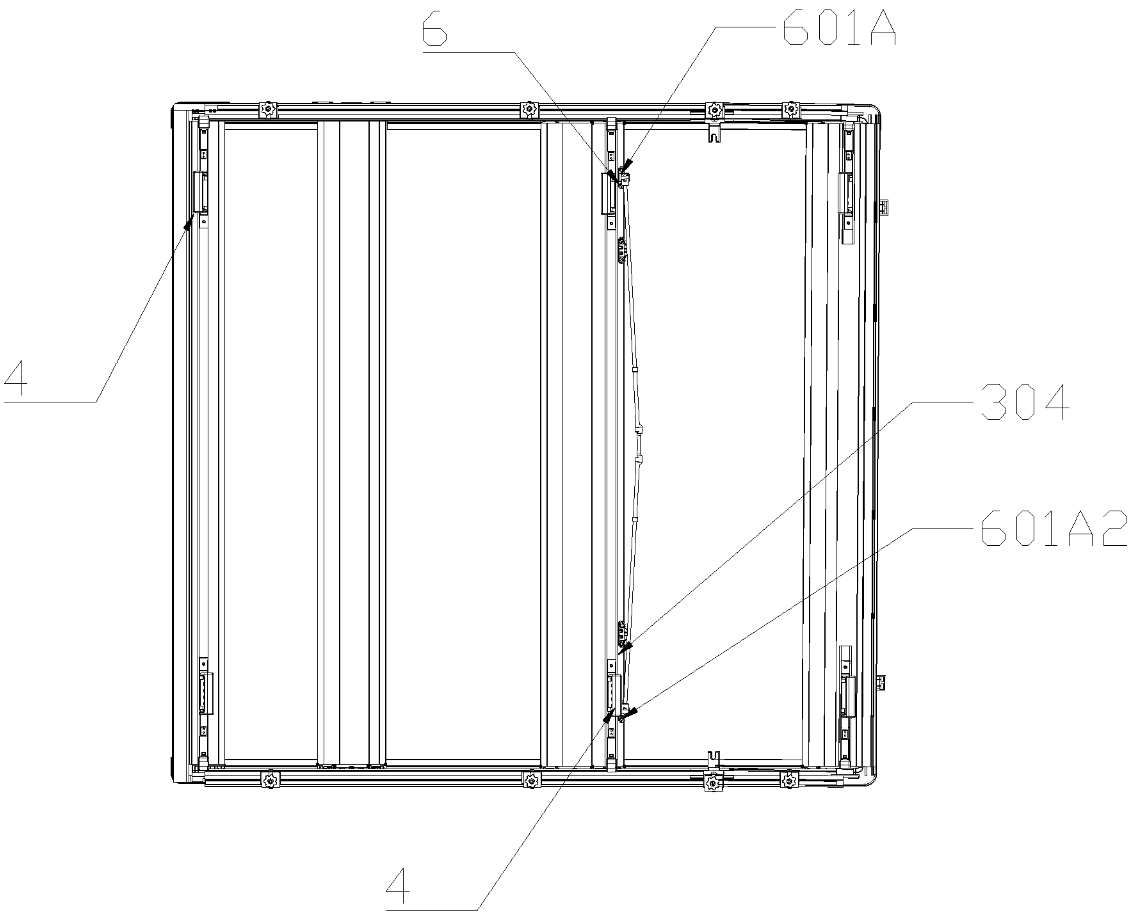
FIG. 27 is a structural schematic diagram V of the present invention.
Figure 28:
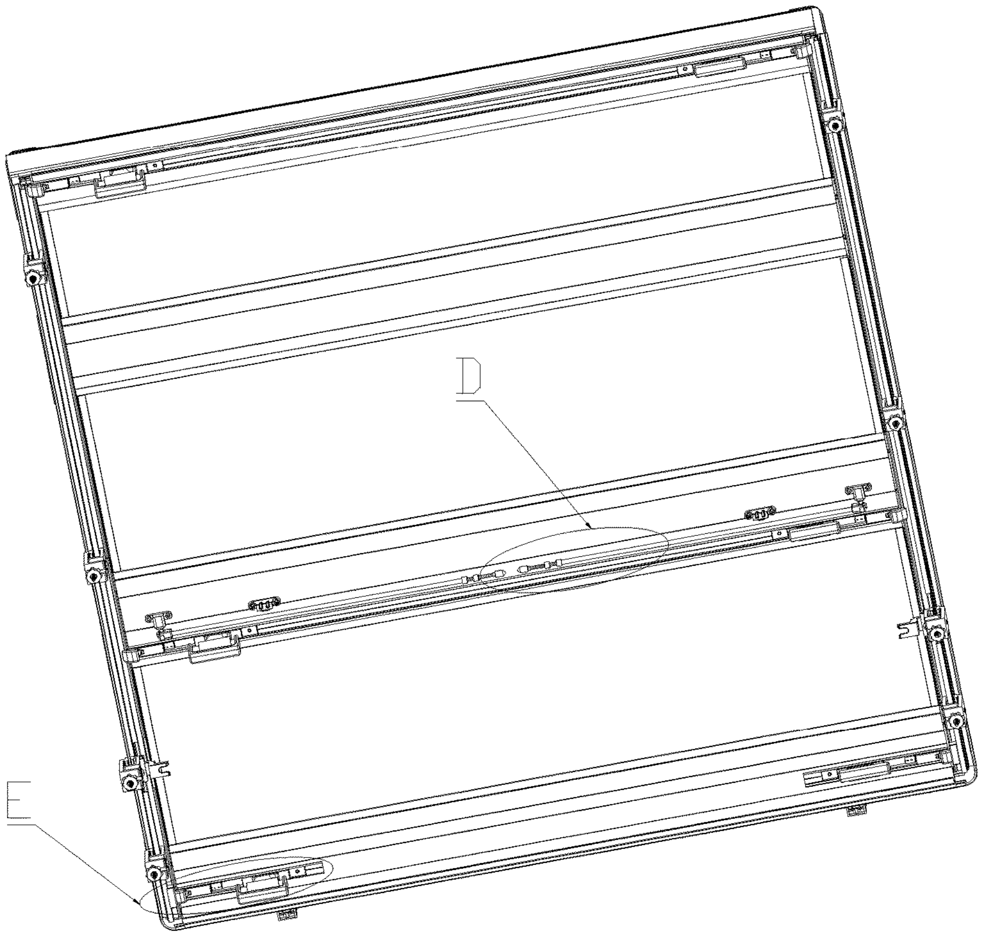
FIG. 28 is a structural schematic diagram VI of the present invention.
Figure 29:
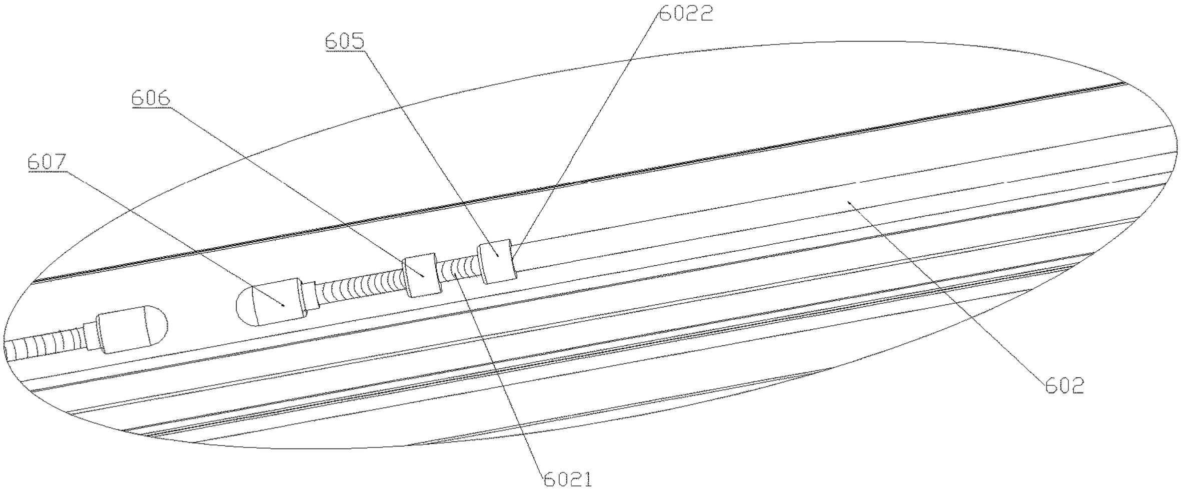
FIG. 29 is a partially enlarged view of part D in FIG. 28.
Figure 30:
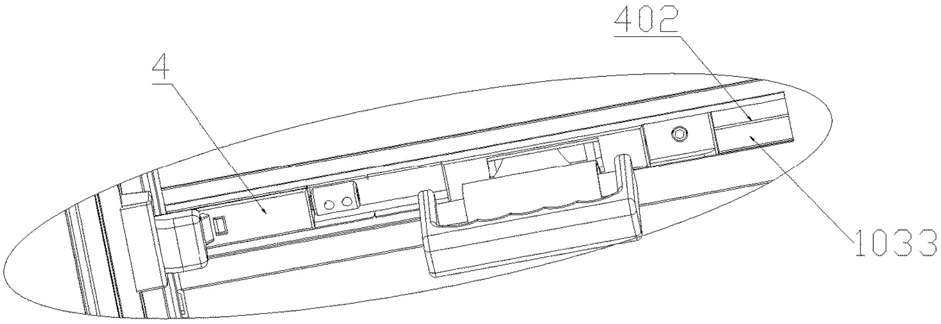
FIG. 30 is a partially enlarged view of part E in FIG. 28.
Figure 31:
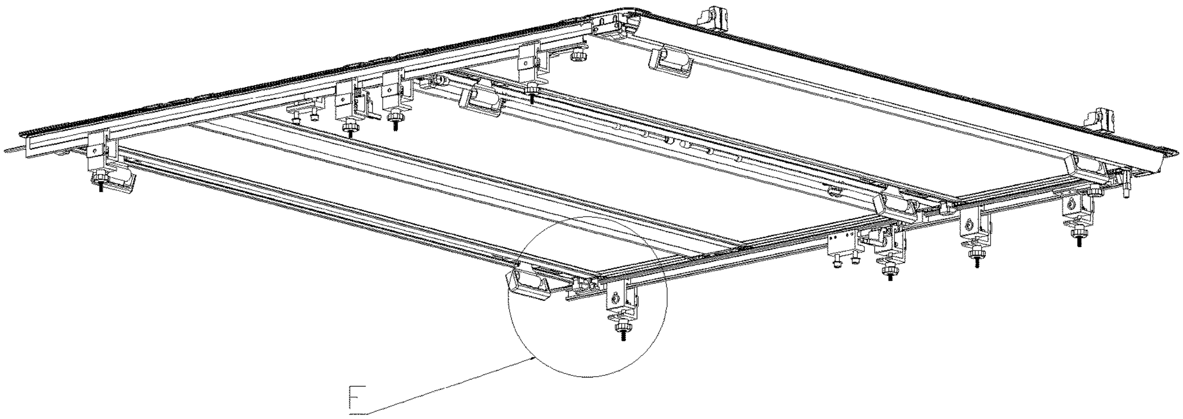
FIG. 31 is a structural schematic diagram VII of the present invention.
Figure 32:
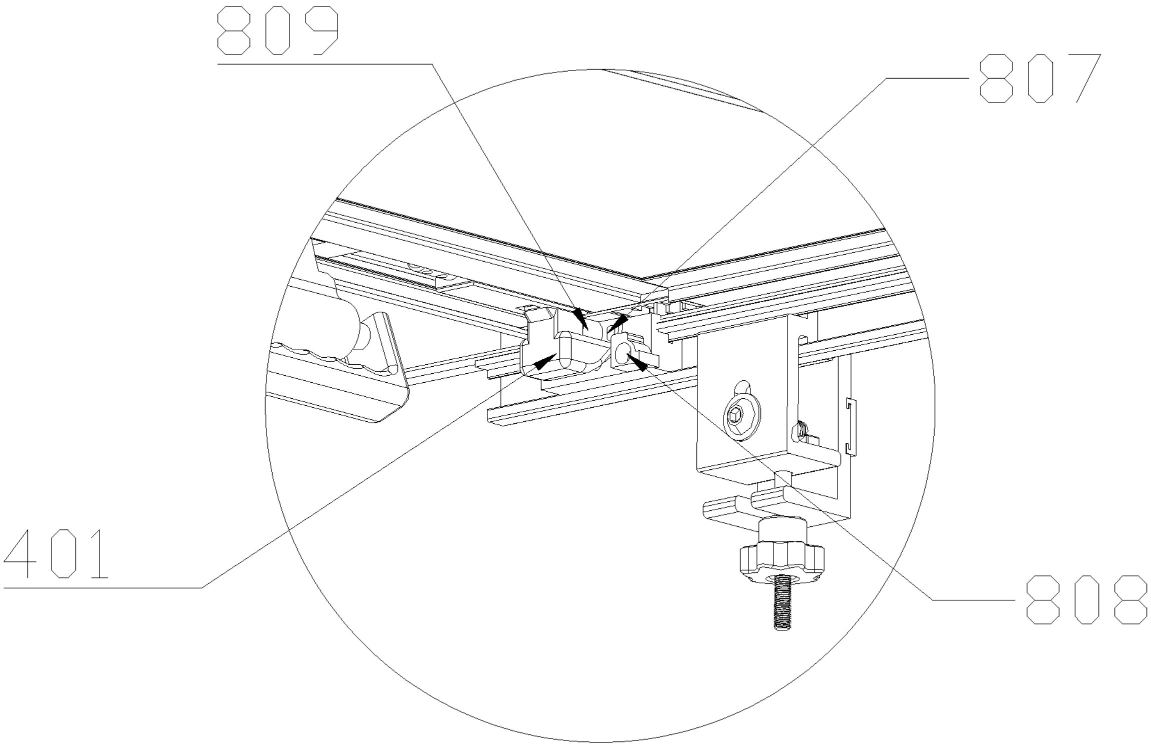
FIG. 32 is a partially enlarged view of part F in FIG. 31.
Figure 33:
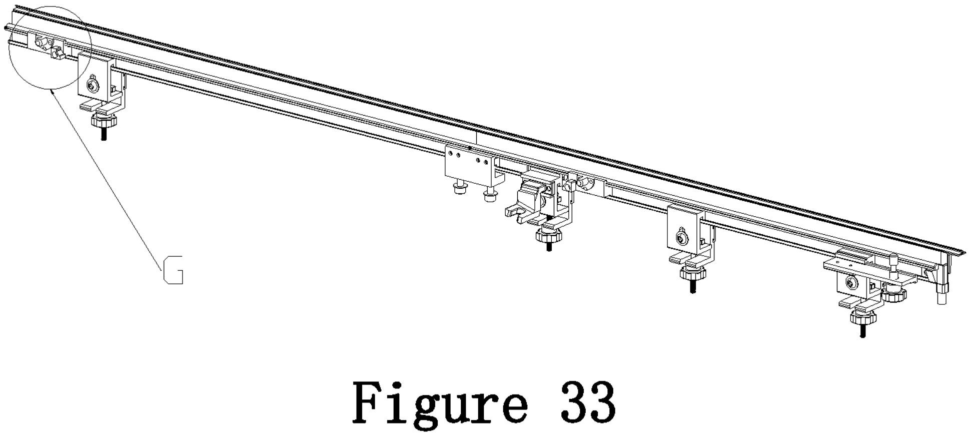
FIG. 33 is a connection schematic diagram of the lock bolt positioning block.
Figure 34:
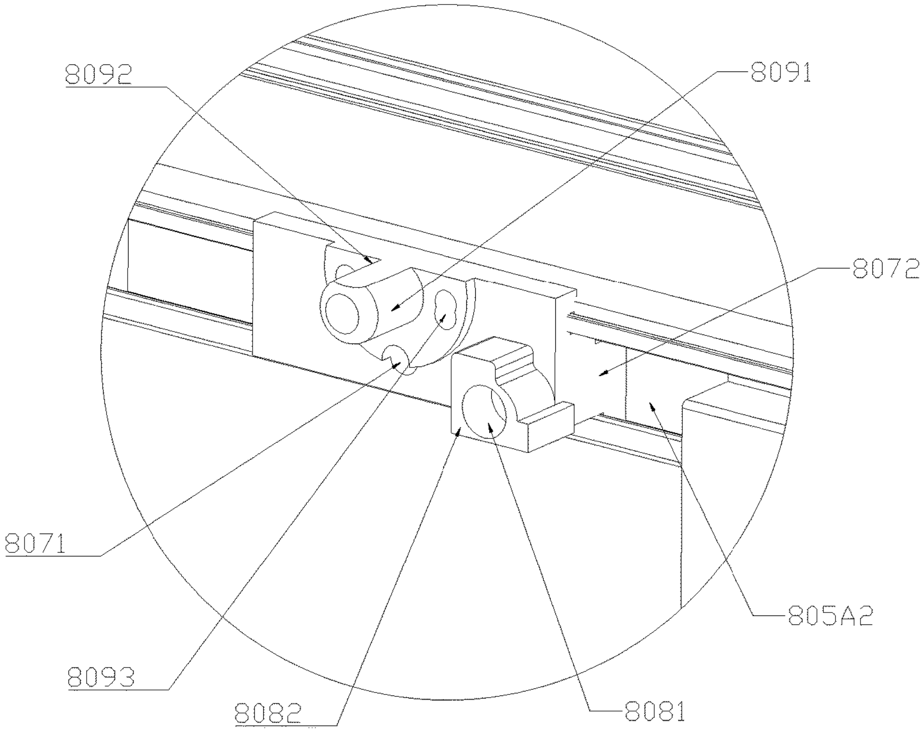
FIG. 34 is a partially enlarged view of part G in FIG. 33.
Figure 35:
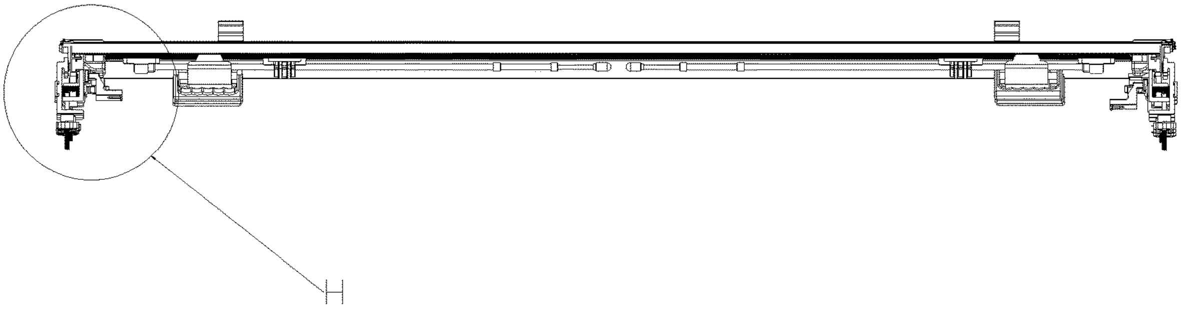
FIG. 35 is a structural schematic diagram VIII of the present invention.
Figure 36:
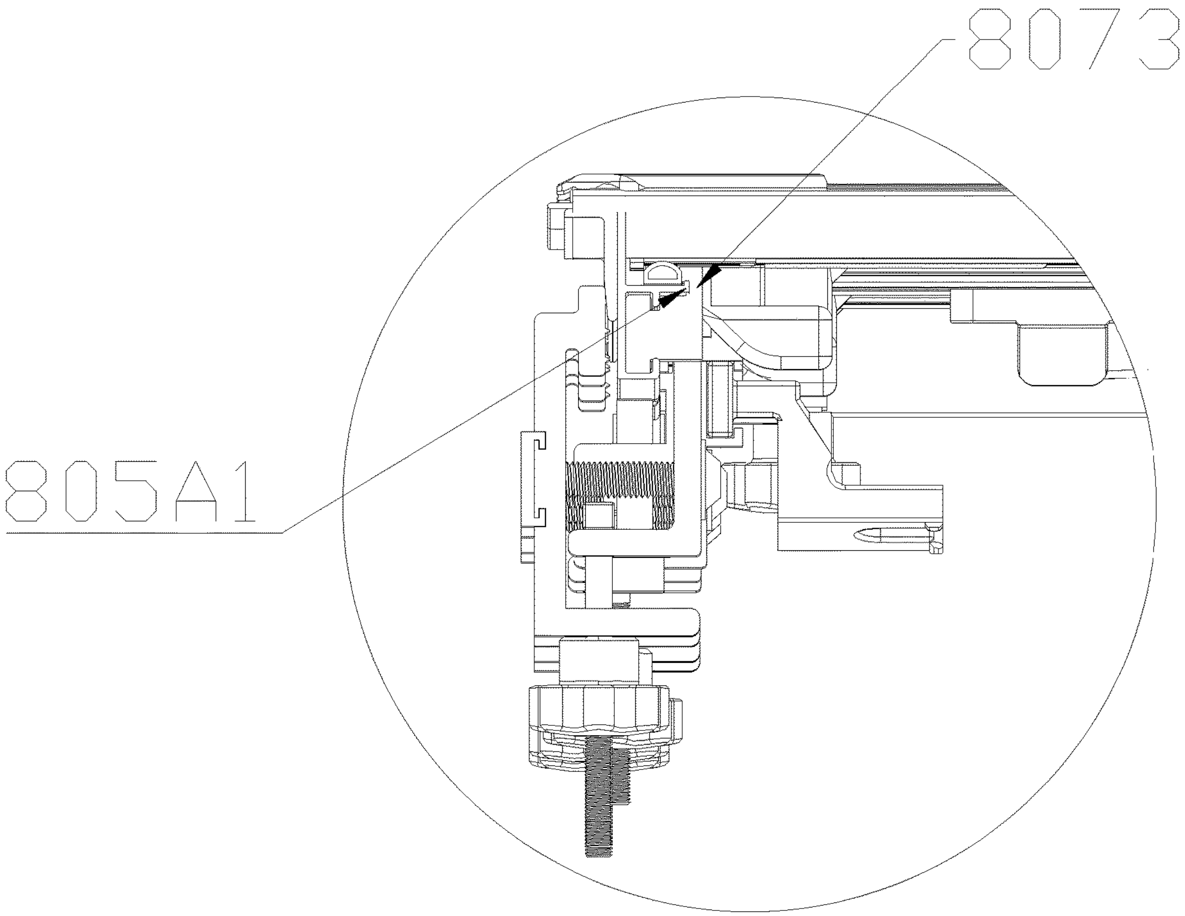
FIG. 36 is a partially enlarged view of part H in FIG. 35.
Figure 37:
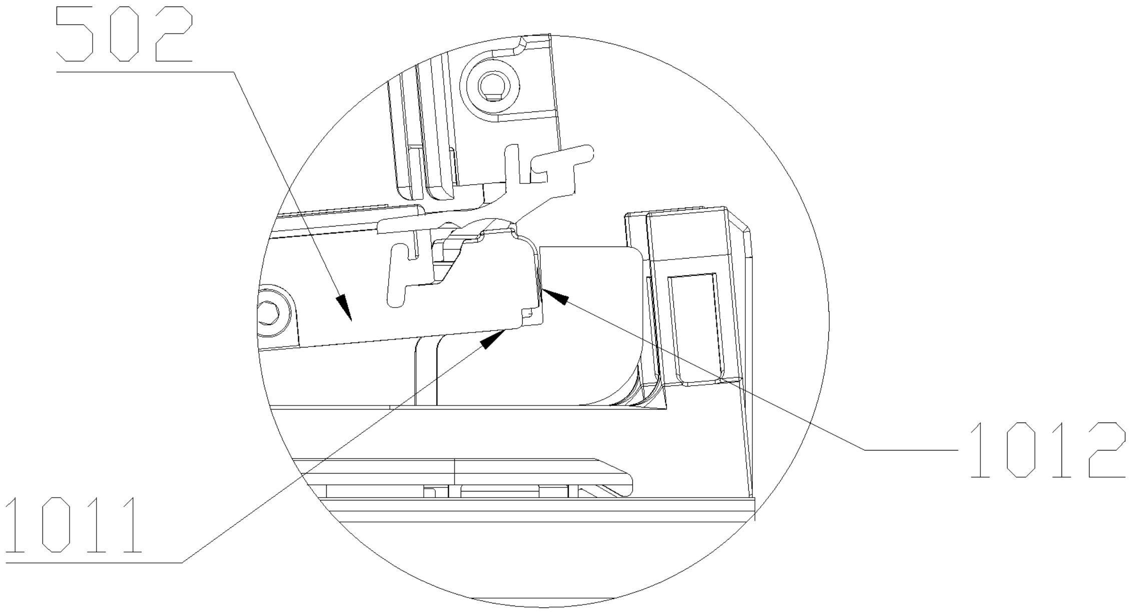
FIG. 37 is a partially enlarged view of part I in FIG. 5.
Figure 38:
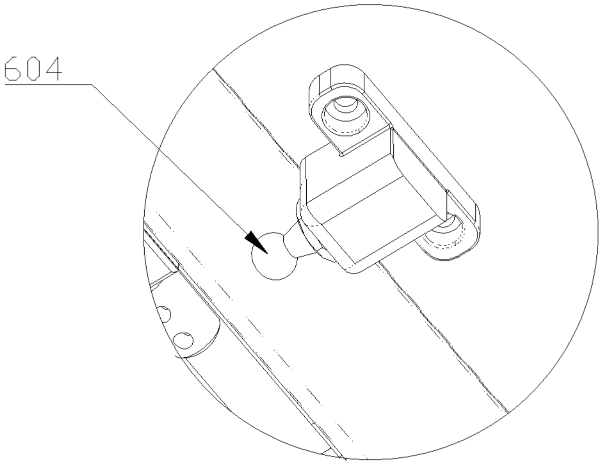
FIG. 38 is a connection schematic diagram I of the ball support.
Figure 39:
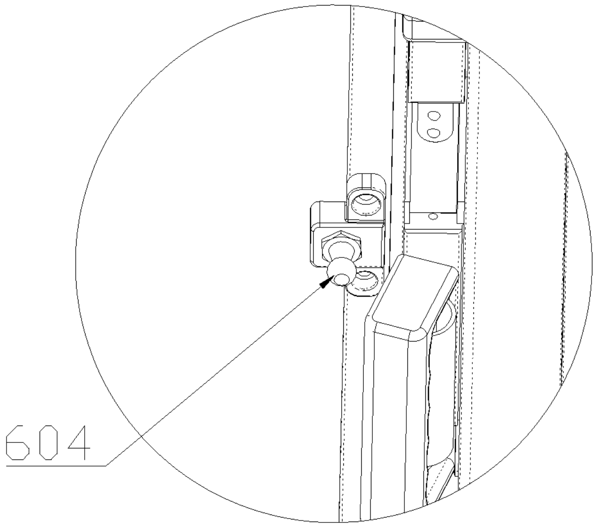
FIG. 39 is a connection schematic diagram II of the ball support.
Figure 40:
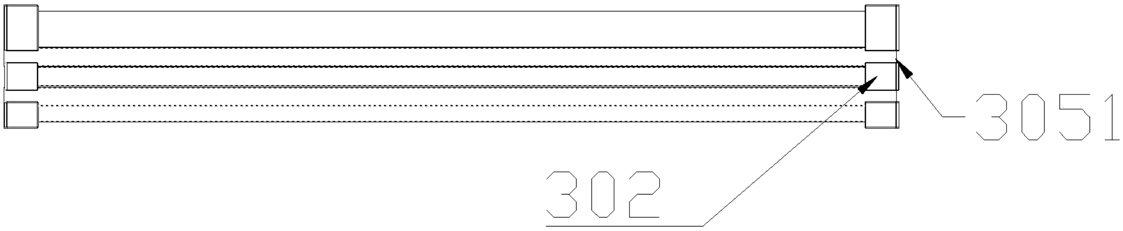
FIG. 40 is a structural schematic diagram of the first rotating shaft system.
Figure 41:
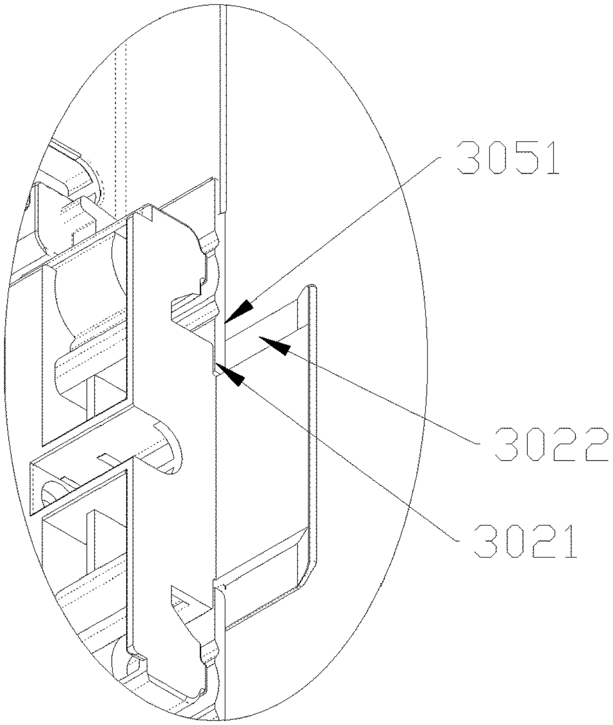
FIG. 41 is a connection schematic diagram of the joint.
Figure 42:
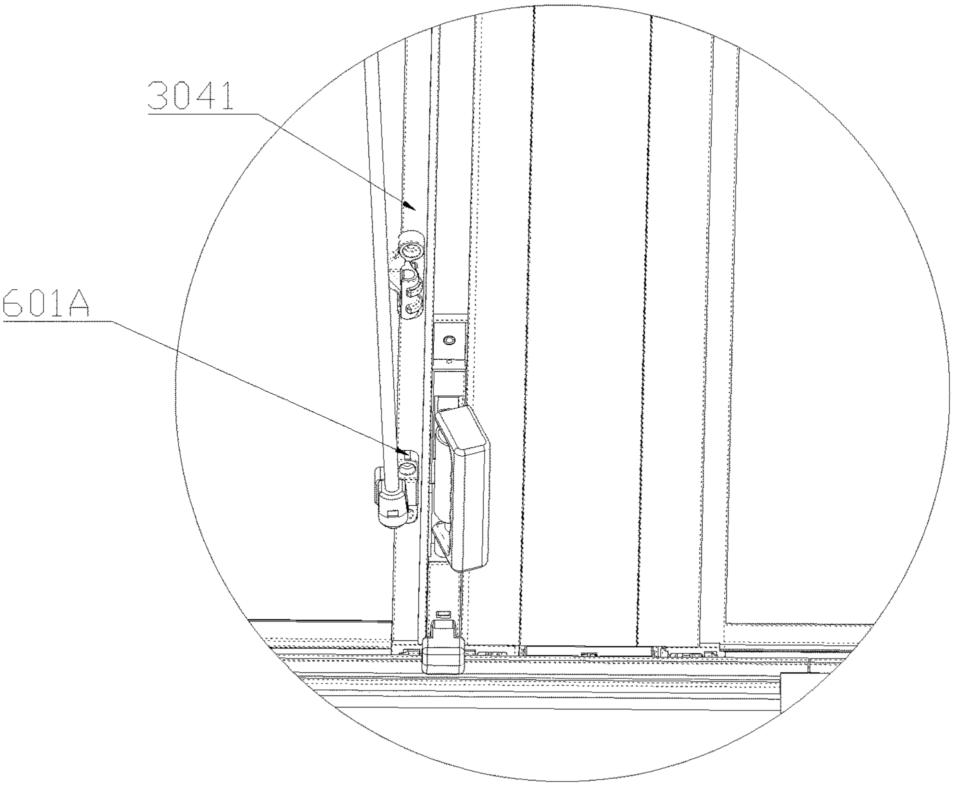
FIG. 42 is a connection schematic diagram I of the cylindrical headstock.
Figure 43:
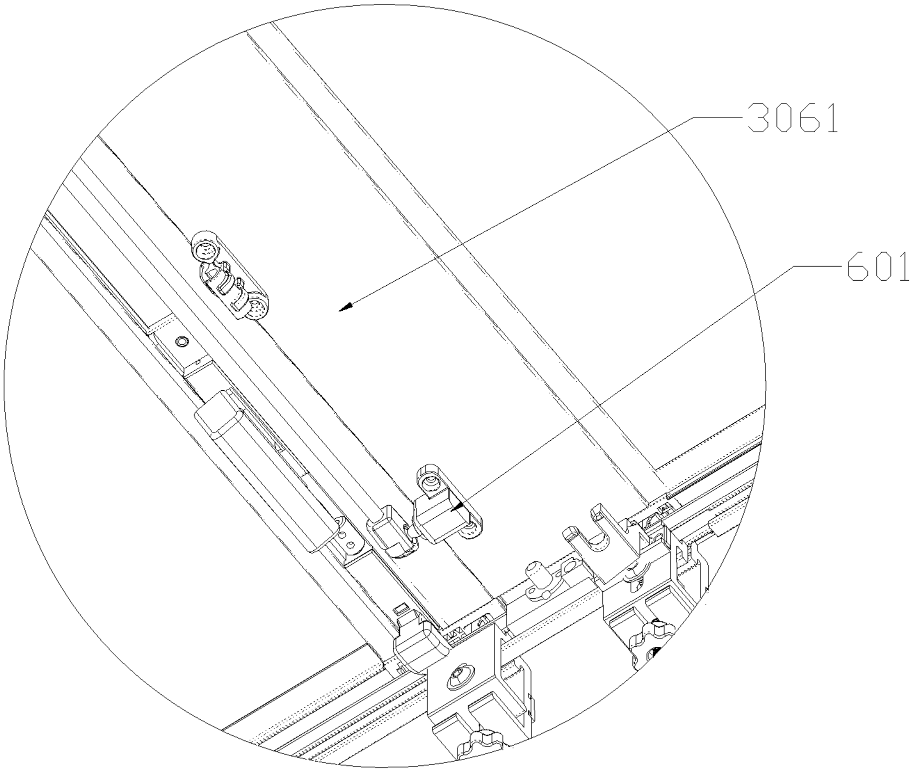
FIG. 43 is a connection schematic diagram II of the cylindrical headstock.
Figure 44:
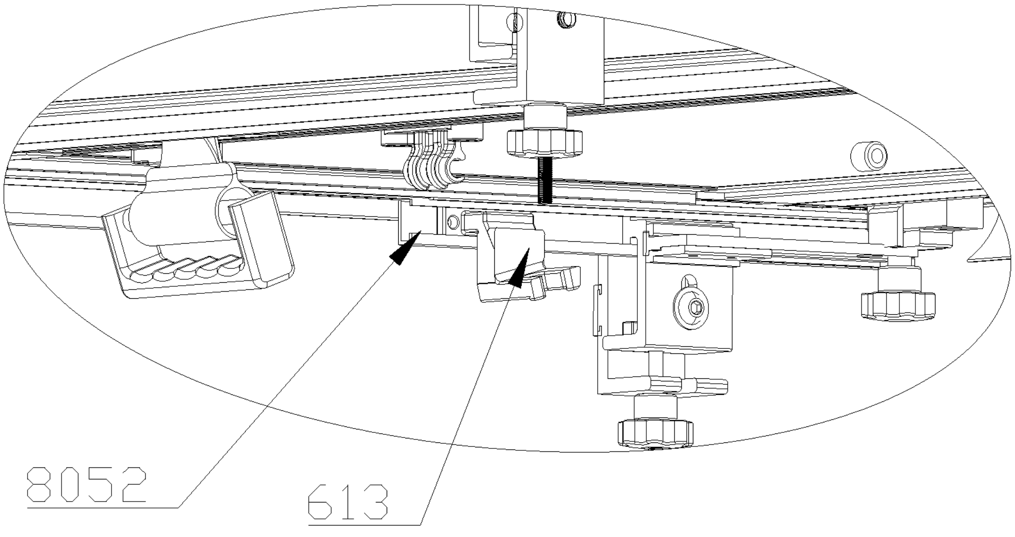
FIG. 44 is a connection schematic diagram of the support block.

Figures: 1—Front bar; 101—Pad; 1011—Bearing surface; 1012—Blocking surface; 102—Supporting seat; 103—First profile; 1031—Snap-in head; 1032—Gluing concave; 1033—Processing groove; 1034—Second insertion hole; 1035—First insertion hole; 104—Second profile; 1041—Round hook; 1042—Profile groove; 1043—Rubber strip plane; 1044—Profile notch; 1045—Third insertion hole; 105—Large front bar joint; 1051—First plug; 1052—Second plug; 1053—Third plug; 106—Small front bar joint; 107—Front bar rubber strip; 1071—Rubber strip flange; 1072—Rubber strip plug; 108—Connecting rod; 1081—Connecting rod rotating shaft; 2—Panel body; 2A—Large panel; 2B—Medium panel; 2C—Small panel; 3—First rotating shaft system; 301—Large joint; 302—Joint; 3021—Gluing port; 3022—Gluing step; 303—Small joint; 304—Large rotating shaft; 3041—Panel notch; 3042—Locking groove; 3043—Steel wire; 3044—Large rotating shaft groove; 305—First rotating shaft rubber strip; 3051—Front of rubber strip; 306—First rotating shaft; 307—Second rotating shaft rubber strip; 3071—Rubber strip clamping foot; 308—Small rotating shaft; 4—Locking system; 401—Lock bolt; 402—Steel wire; 5—Second rotating shaft system; 501—First rotating shaft small joint; 502—Rotating shaft joint; 503—Second rotating shaft small joint; 504—First small rotating shaft; 5041—Panel notch; 5042—Screw hole; 5043—Round hook protrusion; 5044—Small rotating shaft groove; 5045—Gluing groove; 5046—Small rotating shaft round hook; 505—Third rotating shaft rubber strip;

5052—Rubber strip hook; 5053—Concave bottom surface; 5054—Flange bottom; 5055—Convex surface; 506—Second rotating shaft; 5061—Central shaft; 5062—Rotating shaft groove; 5063—Small plane; 5064—Annular channel; 5065—Rotating shaft fixing hole; 507—Fourth rotating shaft rubber strip; 508—Second small rotating shaft; 6—Support rod system; 601—Cylindrical headstock; 601A—Cylindrical headstock; 601A1—Horizontal surface; 601A2—Fixing threaded notch; 6011—Fixing threaded hole; 6012—Cylindrical headstock fixing hole; 6013—Protruding head; 602—Support rod; 6021—Support rod thread; 6022—Support step; 603—Ball head; 604—Ball support; 605—First cylinder; 606—Second cylinder; 607—Bottom cap; 608—T-rod; 609—Plum nut; 610—Screw; 611—Right clamp; 6111—Right clamping surface; 612—Left clamp; 6121—Left clamp groove; 6122—Left clamping surface; 613—Support block; 6131—Support bevelled surface; 6132—Half-waist hole; 6133—Support screw hole; 6134—Support protrusion; 7—Rear bar; 701—Rear bar joint; 702—Rear bar profile; 7021—Positioning protrusion; 7022—Gluing section; 703—Rear bar rubber strip; 7031—Cavity; 7032—Rubber strips protrusion; 7033—Gluing section; 8—Guide rail system; 801—Lock bolt positioning block; 8011—Positioning block groove; 8012—Positioning block screw hole; 8013—Positioning block protrusion; 802—First guide rail rubber strip; 803—Second guide rail rubber strip; 804—Guide rail clamp; 805—Guide rail; 805A—Guide rail; 805A1—Guide rail hook; 805A2—Guide rail groove; 8051—Guide rail notch; 8052—Guide rail support surface; 8053—Covering Plane; 8054—Guide rail groove; 806—Third guide rail rubber strip; 807—Lock bolt base; 8071—Base screw hole; 8072—Base protrusion; 8073—Base barb; 808—Guide rail lock bolt positioning block; 8081—Positioning block fixing hole; 8082—Lock bolt blocking surface; 809—Cylindrical lock bolt; 8091—Cylindrical lock bolt head; 8092—Cylindrical head plane; 8093—Base adjustment hole.

THE CONCRETE METHOD TO CARRY OUT

The following instruction further explains the invention's concrete implementation method.

In order to enable a clearer understanding of the objects mentioned above, features and advantages of the present invention, the invention is described in detail below in connecting with the accompanying Figure and specific embodiments. It should be noted that the embodiments of the present invention and the features in the embodiments can be combined without conflict.

The terms "first", "second", "third", etc. are only used to differentiate the description and should not be construed as indicating or implying relative importance.

In the description of the invention, it should also be noted that, unless otherwise expressly specified and limited, the terms "arranged," "installed," "connected," and "combined" should be understood in a broad sense. for example, it may be a fixing connecting, it can also be a detachable connecting or an integral connecting. it can be a mechanical connecting or an electrical connecting. it can be a direct connecting or an indirect connecting through an intermediate media. And it can be internal connecting within two assemblies. For those of ordinary skill in this field, specific meanings of the above terms in the present invention can be understood in specific situations.

The specific embodiments of the present invention will be described in detail below in connecting with the accompanying Figure. It should be understood that the specific embodiments described herein are intended only to illustrate and explain the present invention and not to limit it.

Embodiment 1

As shown in FIGS. 1-8, a triple-fold semi-embedded cover with lock for a front bar, includes a front bar 1, a panel body 2 (the panel body including a large panel 2A, a medium panel 2B and a small panel 2C), a rotating shaft system, a locking system 4, a support rod system 6, a rear bar 7 and a guide rail system 8;

A plurality of panel bodies 2 are connected between the front bar 1 and the rear bar 7, the two adjacent panel bodies 2 are connected with each other by a rotating shaft system, the rotating shaft system includes a first rotating shaft system 3 and a second rotating shaft system 5, the first rotating shaft system 3 is connected with a first rotating shaft 306, the second rotating shaft system 5 is connected with a second rotating shaft, the first rotating shaft 306 is of a width greater than or equal to the width of the second rotating shaft;

The locking system 4 is connected to the front bar 1 and the rear bar 7, the locking system 4 includes a lock bolt 401, the guide rail system 8 is connected to a lock bolt positioning block 801, the lock bolt positioning block 801 is set in correspondence with the lock bolt 401 of the front bar 1, the lock bolt positioning block 801 is used for limiting the lock bolt 401.

The support rod system 6 is connected to the car cover, the support rod system 6 includes a cylindrical headstock 601, a support rod 602 and a support block 613, the cylindrical headstock 601 is connected to the first rotating shaft 306, the cylindrical headstock 601 is connected to a ball support 604, the ball support 604 is used for connecting the ball head 603 of the support rod 602, the support rod system 6 is connected to a clamp support system, the clamp support system is connected to a car body or a guide rail system 8, the clamp support system is provided with a support block 613 for fixing the support rod 602.

Embodiment 2

As shown in FIGS. 1-8, a tri-fold semi-embedded cover with lock for a front bar, includes a front bar 1, a panel body 2, a rotating shaft system, a locking system 4, a support rod system 6, a rear bar 7 and a guide rail system 8;

A plurality of panel bodies 2 are connected between the front bar 1 and the rear bar 7, the two adjacent panel bodies 2 are connected to each other by a rotating shaft system, the rotating shaft system includes a first rotating shaft system 3 and a second rotating shaft system 5, the first rotating shaft system 3 is connected to a first rotating shaft 306, the second rotating shaft system 5 is connected to a second rotating shaft, the first rotating shaft 306 is of a width greater than or equal to the width of the second rotating shaft;

The locking system 4 is connected to a front bar 1 and a rear bar 7, the locking system 4 includes a lock bolt 401 and a steel wire 402, each end of the steel wire 402 is connected to a lock bolt 401, the guide rail system 8 is connected to a lock bolt positioning block 801, the lock bolt positioning block 801 is set in correspondence with the lock bolt 401 of the front bar 1, the lock bolt positioning block 801 is used for limiting the lock bolt 401;

The guide rail system 8 includes a guide rail 805, the guide rail 805 is provided with a guide rail groove 805A2, the support rod system 6 is connected to the car cover, the support rod system 6 includes a cylindrical headstock 601, a support rod 602 and a support block 613, the support block 613 is provided with a support protrusion 6134, the support protrusion 6134 is inserted into the guide rail groove 805A2, the cylindrical headstock 601 is connected to the first rotating shaft 306, the cylindrical headstock 601 is connected to a ball support 604, the ball support 604 is used for connecting the ball head 603 of the support rod 602, the support block 613 is used for connecting the other end of the support rod 602.

Embodiment 3

As shown in FIGS. 1-8, a tri-fold semi-embedded cover with a lock for a front bar, includes a front bar 1, a panel body 2, a rotating shaft system, a locking system 4, a support rod system 6, a rear bar 7, and a guide rail system 8;

A plurality of panel bodies 2 are connected between the front bar 1 and the rear bar 7, the two adjacent panel bodies 2 are connected to each other by a rotating shaft system, the rotating shaft system includes a first rotating shaft system 3 and a second rotating shaft system 5, the first rotating shaft system 3 is connected to a first rotating shaft 306, the second rotating shaft system 5 is connected to a second rotating shaft, the first rotating shaft 306 is of a width greater than or equal to the width of the second rotating shaft;

The locking system 4 is connected to the front bar 1 and the rear bar 7, the locking system 4 includes a lock bolt 401, the guide rail system 8 is connected to a lock bolt positioning block 801, the lock bolt positioning block 801 is set in correspondence with the lock bolt 401 of the front bar 1, the lock bolt positioning block 801 is used for limiting the lock bolt 401;

The support rod system 6 is connected to the car cover, the support rod system 6 includes a cylindrical headstock 601 and a support rod 602, the cylindrical headstock 601 is connected to a large rotating shaft 304, the cylindrical headstock 601A is connected to a ball support 604, the ball support 604 is used for connecting the ball head 603 of the support rod 602, the support rod system 6 is connected to a clamp support system, the clamp support system is connected to a car body and guide rail system 8, the clamp support system is provided with a support block 613 for fixing the support bar 602, the cylindrical headstock 601A is provided with a horizontal surface 601A1.

Embodiment 4

As shown in FIGS. 1-8, a tri-fold semi-embedded cover with lock for a front bar, includes a front bar 1, a panel body 2, a rotating shaft system, a locking system 4, a support bar system 6, a rear bar 7 and a guide rail system 8;

A plurality of panel bodies 2 are connected between the front bar 1 and the rear bar 7, the two adjacent panel bodies 2 are connected to each other by a rotating shaft system, the rotating shaft system includes a first rotating shaft system 3 and a second rotating shaft system 5, the first rotating shaft system 3 is connected to a first rotating shaft 306, the second rotating shaft system 5 is connected to a second rotating shaft, the first rotating shaft 306 is of a width greater than or equal to the width of the second rotating shaft;

The locking system 4 is connected to the front bar 1 and the rear bar 7, the locking system 4 includes a lock bolt 401, the guide rail system 8 is connected with two pairs of lock bolt positioning blocks 801, wherein one pair of locking tongue positioning blocks 801 is located at the rear side of the lock bolt 401 on the front bar 1, the other pair is located at the front side of the lock bolt 401 on the rear bar 7, the lock bolt positioning blocks 801 are used for limiting the lock bolt 401, the lock bolt positioning block 801 is used for limiting the lock bolt 401, by restricting the two pairs of lock bolt 401 back and forth, so that the car cover will not move back and forth.

The guide rail system 8 includes a guide rail 805A, the guide rail 805A is connected to a lock bolt base 807, the guide rail 805A is provided with a guide rail hook 805A1, the guide rail hook 805A1 is used for mating with the lock bolt base 807, the lock bolt base 807 is provided with a cylindrical lock bolt 809, the cylindrical lock bolt 809 is provided with a base adjustment hole 8093, the base adjustment hole 8093 is provided with an upper and a lower connection adjustment port, the base adjustment hole 8093 is used for adjusting the position of the lock bolt base 807.

Embodiment 5

On the basis of embodiment 1 or 2, as shown in FIGS. 9-15, the support rod system 6 includes a cylindrical headstock 601, a support rod 602, a ball head 603, a ball support 604, a first cylinder 605, a second cylinder 606 and a bottom cap 607;

The cylindrical headstock 601 is provided with a protruding head 6013, a fixing threaded hole 6011 and a cylindrical headstock fixing hole 6012, the fixing threaded holes 6011 are arranged vertically to each other, a screw 610 connects the cylindrical headstock 601 to the first rotating shaft 306 through the cylindrical headstock fixing hole 6012, the fixing threaded holes 6011 are connected to a ball support 604, said fixing threaded hole 6011 is connected to a ball support 604. The ball support 604 is connected to a ball head 603;

One end of said support rod 602 is connected to the ball head 603, the other end of the support rod 602 is connected to the half-waist hole 6132 of the support block 613, the support rod 602 is provided with support rod threads 6021, the first cylinder 605 and the second cylinder 606 are connected to the support rod threads 6021, the end of the support rod 602 is connected to a bottom cap 607. The bottom cap 607 is used to prevent the end of the support rod 602 from scratching the fingers, the half-waist hole 6132 on the support block 613 is clamped by adjusting the distance between the first cylinder 605 and the second cylinder 606 to fix the support rod 602, the support rod 602 is provided with a support step 6022 for blocking the first cylinder 605.

Embodiment 6

On the basis of embodiments 1, 3 and 5, as shown in FIGS. 15-25, the support block 613 is fixed to a clamp support system, the clamp support system includes a T-rod 608, a plum nut 609, a screw 610, a left clamp 612, and a right clamp 611, the left clamp 612 includes a left clamp groove 6121 and a left clamping surface 6122, the right clamp 611 includes a right clamping surface 6111;

The left clamp 612 and the right clamp 611 are connected to each other by means of a screw 610 and a T-rod 608, the T-rod 608 is connected to a plum nut 609.

The support block 613 is provided with a support bevelled surface 6131, a support screw hole 6133 and a support protrusion 6134, the support protrusion 6134 is connected to the left clamp groove 6121, the screw is connected to the left clamp 612 through the support screw hole 6133, the support bevelled surface 6131 is used to support the support rod 602, the left clamping surface 6122 is matted to the right clamping surface 6111.

The left clamp 612 and the right clamp 611 can be clamped directly to the car body, or the guide rail 805 can be clamped together with the car body, when the left clamp 612 and the right clamp 611 clamped to the car body only, the guide rail 805 has to provided a guide rail notch 8051.

Embodiment 7

On the basis of embodiments 2 and 5, as shown in FIGS. 26-36, the support block 613 is connected to the guide rail 805, the support block 613 is provided with a support protrusion 6134 and a support bevelled surface 6131, the support protrusion 6134 is connected to the guide rail groove 8054, the support bevelled surface 6131 is used to support the support rod 602, so as to form a triangular fixation of the support rod 602 and the car cover.

Embodiment 8

On the basis of embodiment 3, as shown in FIGS. 26-36, the cylindrical headstock 601 is provided with a horizontal surface 601A1 and a fixing threaded notch 601A2, the horizontal surface 601A1 is in parallel with the bottom surface of the large rotating shaft 304, the fixing threaded notch 601A2 is used to connect to a ball-head support 604, the ball-head support 604 is used to fix the support rod 602.

Embodiment 9

On the basis of embodiment 1, as shown in FIGS. 26-36, the rear bar 7 includes a rear bar joint 701, a rear bar profile 702 and a rear bar rubber strip 703, wherein the rear bar joint 701 is connected to the lower side of the rear bar profile 702, the rear bar joint 701 is connected to the rear bar rubber strip 703, the rear bar profile 702 is provided with a positioning protrusion 7021 and a gluing section 7022, the rear bar rubber strip 703 is provided with a cavity 7031, a rubber strip protrusion 7032 and a gluing section 7033, the rubber strip protrusion 7032 is provided in cooperation with the positioning protrusion 7021, the gluing section 7022 is bonded to the gluing section 7033.

Embodiment 10

On the basis of embodiment 1, as shown in FIGS. 26-36, the first rotating shaft system 3 includes a large joint 301, a joint 302, a small joint 303, a large rotating shaft 304, a first rotating shaft 306, a first rotating shaft rubber strip 305, a second rotating shaft rubber strip 307, and a small rotating shaft 308;

The large rotating shaft 304 is connected to the first rotating shaft 306 by the first rotating shaft rubber strip 305, the first rotating shaft 306 is connected to the small rotating shaft 308 by the second rotating shaft rubber strip 307, the second rotating shaft rubber strip 307 includes a rubber strip clamping foot 3071, the rubber strip clamping foot 3071 is clamped to the large rotating shaft groove 3044, the large rotating shaft 304, the first rotating shaft 306, the small rotating shaft 308, the first rotating shaft rubber strip 305, second rotating shaft rubber strip 307 form a rotating shaft system, the two ends of the rotating shaft system are connected with a large joint 301, a joint 302 and a small joint 303, the large rotating shaft 304 is provided with a first panel notch 3041, a locking groove 3042, a large rotating shaft groove 3044 and a steel wire 3043, the first panel notch 3041 is used for connecting a panel, the locking groove 3042 is used for connecting the locking system 4, the large rotating shaft groove 3044 is plugged with a steel wire 3043. the steel wire 3043 and the rubber strip jaws are extruded into each other to provide a waterproofing effect. The joint 302 is provided with a gluing port 3021 and a gluing step 3022, the gluing step 3022 is bonded to the front of rubber strip 3051 with glue, the first rotating shaft rubber strip 305 passes through the gluing port 3021. The two ends of the first rotating shaft rubber strip 305 are nearly aligned with the ends of the plurality of joints after the bonding, which increases the aesthetics and waterproofing performance.

Embodiment 11

On the basis of embodiment 1, as shown in FIGS. 26-36, the second rotating shaft system 5 includes a first rotating shaft small joint 501, a rotating shaft joint 502, a second rotating shaft small joint 503, a first small rotating shaft 504, a second rotating shaft 506, a third rotating shaft rubber strip 505, a fourth rotating shaft rubber strip 507, and a second small rotating shaft 508;

The first small rotating shaft 504 is connected to the second rotating shaft 506, the third rotating shaft rubber strip 505 is provided between the first small rotating shaft 504 and the second rotating shaft 506, the second rotating shaft 506 is connected to the second small rotating shaft 508, the fourth rotating shaft rubber strip 507 is provided between the second rotating shaft 506 and the second small rotating shaft 508, the first small rotating shaft 504, the second rotating shaft 506, the second small rotating shaft 508, the third rotating shaft rubber strip 505, and the fourth rotating shaft rubber strip 507 form a rotating shaft system, the two ends of the rotating shaft system are both connected with a first rotating shaft small joint 501, a rotating shaft joint 502, and a second rotating shaft small joint 503;

The first small rotating shaft 504 is provided with a second panel notch 5041, a screw hole 5042, a round hook protrusion 5043, a small rotating shaft groove 5044, a gluing groove 5045 and a small rotating shaft round hook 5046, the second panel notch 5041 is used for connecting to the panel 2, the screw hole 5042 is used for connecting to the second rotating shaft small joint 503, the small rotating shaft groove 5044 is used for snapping in place with the rubber strip hook 5052, the small rotating shaft groove 5044 is connected with a steel wire 3043 attached to it, the gluing groove 5045 is used for applying glue;

The second rotating shaft 506 is provided with a central shaft 5061, an annular channel 5064 and a rotating shaft fixing hole 5065, the small rotating shaft round hook 5046 is rotationally mated with the central shaft 5061, the annular channel 5064 is rotationally mated with the central shaft 5061, the annular channel 5064 is a rotational channel for the small rotating shaft round hook 5046, the rotating shaft fixing hole 5065 is used for connecting the rotating shaft joint 502, the round hook protrusion 5043 is used for hooking the central shaft 5061;

The third rotating shaft rubber strip 505 is provided with a concave bottom surface 5053, a convex surface 5055 and a flange bottom 5054, the second rotating shaft 506 is provided with a small plane 5063, the small plane 5063 is bonded with the flange bottom 5054 by glue, the concave bottom surface 5053 and the convex surface 5055 are provided in correspondence with each other. The convex surface 5055 is aimed at counteracting the concave bottom surface 5053, which makes the rubber strip thinner to cause a strength risk.

Embodiment 12

On the basis of embodiments 1-4, as shown in FIGS. 26-36, the front bar 1 includes a pad block 101, a supporting seat 102, a first profile 103, a second profile 104, a large front bar joint 105, a small front bar joint 106, a front bar rubber strip 107 and a connecting rod 108;

The pad 101 is connected to the supporting seat 102, the pad 101 is in the form of a step, the supporting seat 102 is symmetrically arranged on the first profile 103, the first profile 103 and the second profile 104 form a large front bar 1, the large front bar 1 is connected to the connecting rod 108, a front bar rubber strip 107 is provided between the large front bar 1 and the connecting rod 108, the large front bar 1, the front bar rubber strip 107 and the connecting rod 108 form a front bar 1 system, a large front bar joint 301 and a small front bar joint 106 are connected at both ends of the front bar 1 system;

The second profile 104 is provided with a round hook 1041, a profile groove 1042, a rubber strip plane 1043 and a profile notch 1044, the first profile 103 is provided with a snap-in head 1031, a gluing concave 1032 and a processing groove 1033, the processing groove 1033 is provided with a locking system 4, the front bar rubber strip 107 includes a rubber strip flange 1071 and a rubber strip plug 1072, the profile notch 1044 is mated with the snap-in head 1031, the gluing concave 1032 is used for sealant, the rubber strip plane 1043 is used for mating with the rubber strip plug 1072, the gluing strip flange 1071 is connected with the rubber strip plane 1043;

The connecting rod 108 includes a connecting rod rotating shaft 1081, the connecting rod rotating shaft 1081 is rotationally mated with the round hook 1041 at an angle of rotation of less than 95°.

Embodiment 13

On the basis of embodiments 1, 2 and 3, as shown in FIGS. 9-15, the guide rail system 8 includes a lock bolt positioning block 801, a first guide rail rubber strip 802, a second guide rail rubber strip 803, a guide rail clamp 804, a guide rail 805, and a third guide rail rubber strip 806;

The lock bolt positioning block 801 is connected to the end of the guide rail 805, the guide rail 805 includes a guide rail groove 8054, a covering plane 8053 and a guide rail support surface 8052, the guide rail support surface 8052 is used to support the car cover, the covering plane 8053 covers the surface of the car body, the guide rail groove 8054 is used for connecting the lock bolt positioning block 801 and the guide rail clamp 804, the first guide rail rubber strip 802 is provided on the backside of the guide rail 805, the second guide rail rubber strip 803 is connected to the covering plane 8053, the third guide rail rubber strip 806 is connected to the guide rail support surface 8052.

The lock bolt positioning block 801 includes a positioning block groove 8011, a positioning block screw hole 8012 and a positioning block protrusion 8013, the positioning block protrusion 8013 is connected to the guide rail groove 8054, the lock bolt positioning block 801 is connected to the guide rail 805 through the positioning block screw hole 8012, the positioning block groove 8011 is used to limit the position of the lock bolt 401.

The guide rail 805 is provided with a guide rail notch 8051.

Embodiment 14

On the basis of embodiment 4, as shown in FIGS. 18-36, the guide rail system 8 further includes a guide rail 805, a lock bolt base 807, a guide rail lock bolt positioning block 808 and a cylindrical lock bolt 809;

The guide rail 805 include a guide rail groove 805A2 and a guide rail hook 805A1;

The cylindrical lock bolt 809 is provided with a cylindrical lock bolt head 8091, a cylindrical head plane 8092 and a base adjustment hole 8093;

The guide rail lock bolt positioning block 808 is provided with a positioning block fixing hole 8081 and a lock bolt blocking surface 8082;

The lock bolt base 807 is provided with a base screw hole 8071, a base protrusion 8072 and a base barb 8073;

The cylindrical lock bolt head 8091 is mated with the lock bolt 401, the lock bolt base 807 is connected to the guide rail lock bolt positioning block 808 through the positioning block fixing holes 8081, the cylindrical head plane 8092 is used to avoid interference of the car cover, the base screw holes 8071 fix the lock bolt base 807 to the guide rail 805, the base protrusion 8072 snaps together with the guide rail groove 805A2, the base barbs 8073 is used to hold the guide rail hook 805A1. preventing the lock bolt base 807 from gaping with the guide rail 805 and resulting in tilting of the cylindrical lock bolt 809.

Embodiment 15

On the basis of embodiments 1 and 3, the guide rail 805 is provided with a guide rail notch 8051, the clamp support system is connected to the car body 2, the clamp support system is located in the guide rail notch 8051.

Embodiment 16

On the basis of embodiments 1 and 3, the clamp support system is connected to the car body 2 and a guide rail 805, the guide rail 805 is provided with a guide rail groove 8054, the clamp support system includes a right clamp 611 and a left clamp 612, the left clamp 612 is provided with a left clamping surface 6122, the left clamping surface 6122 extends into the guide rail groove 8054.

Embodiment 16

On the basis of embodiments 1 and 3, the clamp support system is connected to the car body 2 and a guide rail 805, the guide rail 805 is provided with a guide rail groove 8054, the clamp support system includes a right clamp 611 and a left clamp 612, the left clamp 612 is provided with a left clamping surface 6122, the left clamping surface 6122 extends into the guide rail groove 8054.

Embodiment 17

On the basis of Examples 1-4, said cylindrical headstock 601 and ball support 604 are either of a one-piece structure or a split structure, and said cylindrical headstock 601A and ball support 604 are either of a one-piece structure or a split structure.

Embodiment 18

On the basis of embodiments 1-4, the front bar is provided with a pad 101, the pad 101 is provided with a bearing surface 1011 and a blocking surface 1012, the blocking surface 1012 is used to support the car cover. When the vehicle cover is folded vertically, it can be supported on the bearing surface 1011, the blocking surface 1012 is used to block the rotating shaft joint 502, the rotating shaft joint 502 on the vehicle cover is blocked by the blocking surface 1012 so that the car cover is fixed within the space formed by the pads 101.

Embodiment 19

On the basis of embodiment 18, the pad 101 is fixed to the supporting seat 102. The supporting seat 102 is a high strength material that can be used as a socket and as an exoskeleton for the pad 101 to strengthen the pad 101.

Embodiment 20

On the basis of embodiments 1-4, the first rotating shaft system 3 and/or the second rotating shaft system 5 are connected to a locking system 4.

Embodiment 21

Figure 45:
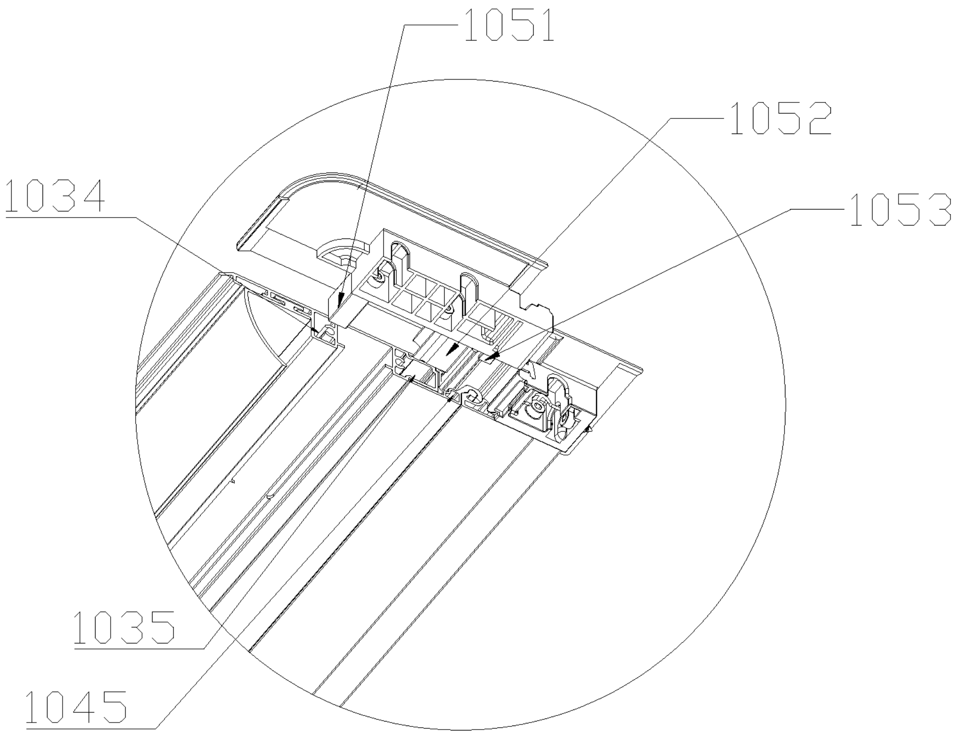
FIG. 45 is a schematic diagram of Embodiment 21.

On the basis of embodiment 12, as shown in FIG. 45, both ends of the first profile 103 and the second profile 104 are connected to a large front bar joint 105, the large front bar joint 105 is provided with a first plug 1051, a second plug 1052 and a third plug 1053, the first profile 103 is provided with a first insertion hole 1035 and a second insertion hole 1034, the second profile 104 is provided with a third insertion hole 1045, the first plug 1051 is provided in correspondence with the first insertion hole 1035, the second plug 1052 is provided in correspondence with the second insertion hole 1034, the third plug 1053 is provided in correspondence with the third insertion hole 1045. Thereby the first profile 103 and the second profile 104 can be locked between the two large front bar joints 105, which are screwed 610 in addition to being plugged in.

The invention is not limited to the above-mentioned optional embodiments. Anyone can come up with various other forms of products under the inspiration of the invention, however, regardless of any changes in its shape or structure. All technical solutions that fall within the scope defined by the claims of the present invention shall fall within the scope of protection of the invention.

What is claimed is:

1. A tri-fold semi-embedded cover with lock for a front bar, wherein, it includes a front bar (1), a panel body (2), a rotating shaft system, a locking system (4), a support rod system (6), a rear bar (7) and a guide rail system (8);

A plurality of panel bodies (2) are connected between the front bar (1) and the rear bar (7), two adjacent panel bodies (2) are connected with each other by the rotating shaft system, the rotating shaft system includes a first rotating shaft system (3) and a second rotating shaft system (5), the first rotating shaft system (3) is connected with a first rotating shaft (306), the second rotating shaft system (5) is connected with a second rotating shaft (506), the first rotating shaft (306) is of a width greater than or equal to the width of the second rotating shaft (506);

The first rotating shaft system (3) includes a large joint (301), a joint (302), a small joint (303), a large rotating shaft (304), a first rotating shaft (306), a first rotating rubber shaft rubber strip (305), a second rotating shaft rubber strip (307), and a small rotating shaft (308), the joint (302) is provided with a gluing-port (3021) and a gluing step (3022), the gluing step (3022) is bonded with a front of rubber strip (3051) with glue, the first rotating shaft rubber strip (305) passes through the gluing port (3021);

The locking system (4) is connected to the front bar (1) and the rear bar (7), the locking system (4) includes a lock bolt (401), the guide rail system (8) is connected to a lock bolt positioning block (801), the lock bolt positioning block (801) is set in correspondence with the lock bolt (401) of the front bar (1), the lock bolt positioning block (801) is used for limiting the lock bolt (401);

The support rod system (6) is connected to a car cover, the support rod system (6) includes a cylindrical headstock (601), a support rod (602) and a support block (613), the cylindrical headstock (601) is connected to the first rotating shaft (306), the cylindrical headstock (601) is connected to a ball support (604), the ball support (604) is used for connecting a ball head (603) of the support rod (602), the support rod system (6) is connected to a clamp support system, wherein the clamp support system is provided with the support block (613) for fixing the support rod (602).

2. A tri-fold semi-embedded cover with lock for a front bar, wherein, it includes a front bar (1), a panel body (2), a rotating shaft system, a locking system (4), a support rod system (6), a rear bar (7) and a guide rail system (8);

The front bar (1) and the rear bar (7) are connected with a plurality of panel bodies (2), two adjacent panel bodies (2) are connected with each other by a rotating shaft system, the rotating shaft system includes a first rotating shaft system (3) and a second rotating shaft system (5), the first rotating shaft system (3) is connected with a first rotating shaft (306), the second rotating shaft system (5) is connected with a second rotating shaft (506), the first rotating shaft (306) is of a width greater than or equal to the width of the second rotating shaft (506);

The first rotating shaft system (3) includes a large joint (301), a joint (302), a small joint (303), a large rotating shaft (304), a first rotating shaft (306), a first rotating rubber shaft rubber strip (305), a second rotating shaft rubber strip (307), and a small rotating shaft (308), the joint (302) is provided with a gluing-port (3021) and a gluing step (3022), the gluing step (3022) is bonded with a front of rubber strip (3051) with glue, the first rotating shaft rubber strip (305) passes through the gluing port (3021);

The locking system (4) is connected to the front bar (1) and a rear bar (7), the locking system (4) includes a lock bolt (401), the guide rail system (8) is connected to a lock bolt positioning block (801), the lock bolt positioning block (801) is set in correspondence with the lock bolt (401) of the front bar (1), the lock bolt positioning block (801) is used for limiting the lock bolt (401);

The guide rail system (8) includes a guide rail (805), the guide rail (805) is provided with a guide rail groove (8054), the support rod system (6) is connected to a car cover, the support rod system (6) includes a cylindrical headstock (601), a support rod (602) and a support block (613), the support block (613) is provided with a support protrusion (6134), the support protrusion (6134) is inserted into the guide rail groove (8054), the cylindrical headstock (601) is connected to the first rotating shaft (306), the cylindrical headstock (601) is connected to a ball support (604), the ball support (604) is used for connecting the ball head (603) of the support rod (602), and the support block (613) is used for connecting the other end of the support rod (602).

3. A tri-fold semi-embedded cover with lock for a front bar, wherein, it includes a front bar (1), a panel body (2), a rotating shaft system, a locking system (4), a support rod system (6), a rear bar (7), and a guide rail system (8);

The front bar (1) and the rear bar (7) are connected with a plurality of panel bodies (2), two adjacent panel bodies (2) are connected with each other by a rotating shaft system, the rotating shaft system includes a first rotating shaft system (3) and a second rotating shaft system (5), the first rotating shaft system (3) is connected with a first rotating shaft (306), the second rotating shaft system (5) is connected with a second rotating shaft (506), the first rotating shaft (306) is of a width greater than or equal to the width of the second rotating shaft (506);

The first rotating shaft system (3) includes a large joint (301), a joint (302), a small joint (303), a large rotating shaft (304), a first rotating shaft (306), a first rotating rubber shaft rubber strip (305), a second rotating shaft rubber strip (307), and a small rotating shaft (308), the joint (302) is provided with a gluing-port (3021) and a gluing step (3022), the gluing step (3022) is bonded with a front of rubber strip (3051) with glue, the first rotating shaft rubber strip (305) passes through the gluing port (3021);

The locking system (4) is connected to the front bar (1) and the rear bar (7), the locking system (4) includes a lock bolt (401), the guide rail system (8) is connected to a lock bolt positioning block (801), the lock bolt positioning block (801) is set in correspondence with the lock bolt (401) of the front bar (1), the lock bolt positioning block (801) is used for limiting the lock bolt (401);

The support rod system (6) is connected to the car cover, the support rod system (6) includes a cylindrical headstock (601A) and a support rod (602), the cylindrical headstock (601A) is connected to a large rotating shaft (304), the cylindrical headstock (601A) is connected to a ball support (604), the ball support (604) is used for connecting the ball head (603) of the support rod (602), the support rod system (6) connected to a clamp support system, the clamp support system provided with a support block (613) for fixing the support rod (602), the cylindrical headstock (601A) provided with a horizontal surface (601A1).

4. A tri-fold semi-embedded cover with lock for a front bar, wherein, it includes a front bar (1), a panel body (2), a rotating shaft system, a locking system (4), a support rod system (6), a rear bar (7) and a guide rail system (8);

The front bar (1) and the rear bar (7) are connected with a plurality of panel bodies (2), two adjacent panel bodies (2) are connected with each other by a rotating shaft system, the rotating shaft system includes a first rotating shaft system (3) and a second rotating shaft system (5), the first rotating shaft system (3) is connected with a first rotating shaft (306), the second rotating shaft system (5) is connected with a second rotating shaft (506), the said first rotating shaft (306) is of a width greater than or equal to the width of the second rotating shaft (506);

The first rotating shaft system (3) includes a large joint (301), a joint (302), a small joint (303), a large rotating shaft (304), a first rotating shaft (306), a first rotating rubber shaft rubber strip (305), a second rotating shaft rubber strip (307), and a small rotating shaft (308), the joint (302) is provided with a gluing-port (3021) and a gluing step (3022), the gluing step (3022) is bonded with a front of rubber strip (3051) with glue, the first rotating shaft rubber strip (305) passes through the gluing port (3021);

The locking system (4) is connected to the front bar (1) and the rear bar (7), the locking system (4) includes a lock bolt (401), the guide rail system (8) is connected with two pairs of lock bolt positioning blocks (801), wherein one pair of lock bolt positioning blocks (801) is located at the rear side of the lock bolt (401) on the front bar (1), the other set of lock bolt positioning blocks (801) is located at the front side of the lock bolt (401) on the rear bar (7), the lock bolt positioning blocks (801) are used for limiting the lock bolt (401);

The guide rail system (8) includes a guide rail (805A), the guide rail (805A) is connected to a lock bolt base (807), the guide rail (805A) is provided with a guide rail hook (805A1), the guide rail hook (805A1) is used for matting with the lock bolt base (807), the lock bolt base (807) is provided with a cylindrical lock bolt (809), the cylindrical lock bolt (809) is provided with a base adjustment hole (8093), the base adjustment hole (8093) is provided with an upper and a lower connection adjustment port, the base adjustment hole (8093) is used to adjust the position of the lock bolt base (807).

5. A tri-fold semi-embedded cover with lock for a front bar according to claim 1 or 2, wherein, the support rod system (6) includes a cylindrical headstock (601), a support rod (602), a ball head (603), a ball support (604), a first cylinder (605), a second cylinder (606), and a bottom cap (607);

The cylindrical headstock (601) is provided with a protruding head (6013), a fixing threaded hole (6011) and a cylindrical headstock fixing hole (6012), the fixing threaded hole (6011) and the cylindrical headstock fixing hole (6012) are arranged vertically to each other, a screw (610) connects the cylindrical headstock (601) to the first rotating shaft (306) through the cylindrical headstock fixing hole (6012), said fixing threaded holes (6011) are connected to a ball support (604), the ball support (604) is connected to a ball head (603);

One end of the support rod (602) is connected to the ball head (603), the other end of the support rod (602) is connected to the half-waist hole (6132) of the support block (613), the support rod (602) is provided with a support rod thread (6021), the support rod thread (6021) is connected to a first cylinder (605) and a second cylinder (606), the end of the support rod (602) is connected to a with a bottom cap (607).

6. A tri-fold semi-embedded cover with lock for a front bar according to claim 1 or 3, wherein, the support block (613) is secured to a clamp support system, the clamp support system includes a T-rod (608), a plum nut (609), a screw (610), a left clamp (612), and a right clamp (611), the left clamp (612) includes a left clamp groove (6121) and a left clamping surface (6122), the right clamp (611) includes a right clamping surface (6111);

The left clamp (612) and the right clamp (611) are connected to each other by means of the screw (610) and the T rod (608), the T rod (608) is connected to a plum nut (609);

The support block (613) is provided with a support bevelled surface (6131), a support screw hole (6133) and a support protrusion (6134), the support protrusion (6134) is connected to the left clamp groove (6121), the screw is connected to the left clamp (612) through the support screw hole (6133), the support bevelled surface (6131) is used to support the support rod (602), the left clamping surface (6122) is mated with the right clamping surface (6111).

7. A tri-fold semi-embedded cover with lock for a front bar according to claim 2, wherein, the support block (613) is connected to the guide rail (805), the support block (613) is provided with a support protrusion (6134) and a support bevelled surface (6131), the support protrusion (6134) is connected to the guide rail groove (8054), the support bevelled surface (6131) is used to support the support rod (602).

8. A tri-fold semi-embedded cover for front bar with lock according to claim 3, wherein, the cylindrical headstock (601) is provided with a horizontal surface (601A1) and a fixing threaded notch (601A2), the horizontal surface (601A1) is in parallel with the bottom surface of the large rotating shaft (304), the fixing threaded notch (601A2) is used to connect a ball support (604), the ball support (604) is used to fix the support rod (602).

9. A tri-fold semi-embedded cover with lock for a front bar according to anyone of claims 1-4, wherein, the rear bar (7) includes a rear bar joint (701), a rear bar profile (702) and a rear bar rubber strip (703), wherein the rear bar joint (701) is connected to the lower side of the rear bar profile (702), the rear bar joint (701) is connected to the rear bar rubber strip (703), the rear bar profile (702) is provided with a positioning protrusion (7021) and a first gluing section (7022), the rear bar rubber strip (703) is provided with a cavity (7031), a rubber strip protrusion (7032) and a second gluing section (7033), the rubber strip protrusion (7032) is provided in cooperation with the positioning protrusion (7021), the first gluing section (7022) is bonded to the second gluing section (7033).

10. A tri-fold semi-embedded cover for front rail with locks according to anyone of claims 1-4, wherein, The large rotating shaft (304) is connected to the first rotating shaft (306) by the first rotating shaft rubber strip (305), the first rotating shaft (306) is connected to the small rotating shaft (308) by the second rotating shaft rubber strip (307), the second rotating shaft rubber strip (307) includes a rubber strip clamping foot (3071), the rubber strip clamping foot (3071) is clamped with the large rotating shaft groove (3044), the large rotating shaft (304), the first rotating shaft (306), the small rotating shaft (308), the first rotating shaft rubber strip (305), and the second rotating shaft rubber strip (307) form a rotating shaft system, the two ends of the rotating shaft system are connected with the large joint (301), the joint (302), and the small joint (303), the large rotating shaft (304) is provided with a first panel notch (3041), a locking groove (3042), a large rotating shaft groove (3044) and a steel wire (3043), the first panel notch (3041) is used for connecting the panel, the locking groove (3042) is used for connecting the locking system (4), the large rotating shaft groove (3044) is plugged with a steel wire (3043).

11. A tri-fold semi-embedded cover with lock for a front bar according to anyone of claims 1-4, wherein, the second rotating shaft system (5) includes a first rotating shaft small joint (501), a rotating shaft joint (502), a second rotating shaft small joint (503), a first small rotating shaft (504), a second rotating shaft (506), a third rotating shaft rubber strip (505), a fourth rotating shaft rubber strip (507), and a second small rotating shaft (508);

The first small rotating shaft (504) is connected to the second rotating shaft (506), the third rotating shaft rubber strip (505) is provided between the first small rotating shaft (504) and the second rotating shaft (506), the second small rotating shaft (508) is connected to the second small rotating shaft (508), the fourth rotating shaft rubber strip (507) is provided between the second rotating shaft (506) and the second small rotating shaft (508), the first small rotating shaft (504), the second rotating shaft (506), the second small rotating shaft (508), the third rotating shaft rubber strip (505), the fourth rotating shaft rubber strip (507) form a rotating shaft system, the two ends of the rotating shaft system are both connected with a first rotating shaft small joint (501), a rotating shaft joint (502), and a second rotating shaft small joint (503);

The first small rotating shaft (504) is provided with a second panel notch (5041), a screw hole (5042), a round hook protrusion (5043), a small rotating shaft groove (5044), a gluing groove (5045) and a small rotating shaft round hook (5046), the second panel notch (5041) is used for connecting to the panel (2), the screw hole (5042) is used for connecting to the second rotating shaft joint (503), the small rotating shaft groove (5044) is used for snapping in place with the rubber strip hook (5052), the small rotating shaft groove (5044) is connected with a steel wire (3043), the gluing groove (5045) is used for applying glue;

The second rotating shaft (506) is provided with a central shaft (5061), an annular channel (5064) and a rotating shaft fixing hole (5065), the small rotating shaft round hook (5046) is rotationally mated with the central shaft (5061), the annular channel (5064) is rotationally mated with the central shaft (5061), the annular channel (5064) is a rotational channel for the small rotating shaft round hook (5046), the rotating shaft fixing hole (5065) is used for connecting a rotating shaft joint (502), the round hook protrusion (5043) is used for hooking the central shaft (5061);

The third rotating shaft rubber strip (505) is provided with a concave bottom surface (5053), a convex surface (5055) and a flange bottom (5054), the second rotating shaft (506) is provided with a small plane (5063), the small plane (5063) is bonded with the flange bottom (5054) by glue, the concave bottom surface (5053) and the convex surface (5055) are provided in correspondence with each other.

12. A tri-fold semi-embedded cover with lock for a front bar according to anyone of claims 1-4, wherein, the front bar (1) includes a pad (101), a supporting seat (102), a first profile (103), a second profile (104), a large front bar joint (105), a small front bar joint (106), a front bar rubber strip (107) and a connecting rod (108);

The pad (101) is connected to the supporting seat (102), the pad (101) is in the shape of a step, the supporting seat (102) is symmetrically arranged on the first profile (103), the first profile (103) and the second profile (104) form a large front bar, the large front bar is connected to a connecting rod (108), a front bar rubber strip (107) is provided between the large front bar and the connecting rod (108), the front bar, the front bar rubber strip (107) and the connecting rod (108) form a front bar system, a large joint (301) and a small front bar joint (106) are connected at both ends of the front bar system;

The second profile (104) is provided with a round hook (1041), a profile groove (1042), a rubber strip plane (1043) and a profile notch (1044), the first profile (103) is provided with a snap-in head (1031), a gluing concave (1032) and a processing groove (1033), the processing groove (1033) is provided with a locking system (4), the front bar rubber strip (107) includes a rubber strip flange (1071) and a rubber strip plug (1072), the profile notch (1044) is mated with the snap-in head (1031), the gluing concave (1032) is used for sealant, the rubber strip plane (1043) is used for mating with the rubber strip plug (1072), the rubber strip flange (1071) is connected with the rubber strip plane (1043);

The connecting rod (108) includes a connecting rod rotating shaft (1081), the connecting rod rotating shaft (1081) is rotationally mated with the round hook (1041) at an angle of rotation of less than 95°.

13. A tri-fold semi-emdedded cover with lock for the front bar according to anyone of claims 1-4, wherein, the guide rail system (8) includes a lock bolt positioning block (801), a first guide rail rubber strip (802), a second guide rail rubber strip (803), a guide rail clamp (804), a guide rail (805), and a third guide rail rubber strip (806);

The lock bolt positioning block (801) is connected to the end of the guide rail (805), the guide rail (805) includes a guide rail groove (8054), a covering plane (8053), and a guide rail support surface (8052), the guide rail support surface (8052) is used to support the car cover, the covering plane (8053) covers the surface of the car body, the guide rail groove (8054) is used for connecting the lock bolt positioning block (801) and a guide rail clamp (804), the first guide rail rubber strip (802) is provided on the backside of the guide rail (805), the second guide rail rubber strip (803) is connected to the covering plane (8053), the third guide rail rubber strip (806) is connected to the guide rail support surface (8052);

The lock bolt positioning block (801) includes a positioning block groove (8011), a positioning block screw hole (8012) and a positioning block protrusion (8013), the positioning block protrusion (8013) is connected to the guide rail groove (8054), the lock bolt positioning block (801) is connected to the guide rail (805) through the positioning block screw hole 8012, the lock bolt groove (8011) is used for locking the lock bolt (401).

14. A tri-fold semi-embedded cover with lock for a front bar according to anyone of claims 1-4, wherein, the guide rail system (8) further includes a guide rail (805), a lock bolt base (807), a guide rail lock bolt positioning block (808), and a cylindrical lock bolt (809);

The guide rail (805) includes a guide rail groove (805A2) and a guide rail hook (805A1);

The cylindrical lock bolt (809) is provided with a cylindrical lock bolt head (8091), a cylindrical head plane (8092) and a base adjustment hole (8093);

The guide rail lock bolt positioning block (808) includes a positioning block fixing hole (8081) and a lock bolt blocking surface (8082);

The lock bolt base (807) is provided with a base screw hole (8071), a base protrusion (8072) and a base barb (8073);

The cylindrical lock bolt head (8091) is mated with the lock bolt (401), the lock bolt base (807) is connected to the guide rail lock bolt positioning block (808) through the positioning block fixing holes (8081), the base screw holes (8071) fix the lock bolt base (807) to the guide rail (805), the base protrusion (8072) snaps together with the guide rail groove (805A2), the base barbs (8073) is used to hold the guide rail hook (805A1).

15. A tri-fold semi-embedded cover with lock for a front bar according to anyone of claims 1 or 3, wherein, the guide rail (805) is provided with a guide rail notch (8051), the clamp support system is connected to the car body (2), the clamp support system is located in the guide rail notch (8051).

16. A tri-fold semi-embedded cover with lock for a front bar according to anyone of claims 1 or 3, wherein, the clamp support system is connected to the car body 2 and the guide rail (805), the guide rail (805) is provided with a guide rail groove (8054), the clamp support system includes a right clamp (611) and a left clamp (612), the left clamp (612) is provided with a left clamping surface (6122), the left clamping surface (6122) extends into the guide rail groove (8054).

17. A tri-fold semi-embedded cover with lock for a front bar according to anyone of claims 1-4, wherein, the cylindrical headstock (601) and ball support (604) are either of one-piece structure or a split structure.

18. A tri-fold semi-embedded cover with lock for a front bar according to anyone of claims 1-4, wherein, the front bar (1) is provided with a pad (101), the pad (101) is provided with a bearing surface (1011) and a blocking surface (1012), the bearing surface (1011) is used to support the cover when the cover is folded vertically, the blocking surface (1012) is used to block the rotating shaft joint (502), thus the car cover is fixed within the space formed by the pads (101).

19. A tri-fold semi-embedded cover with lock for a front bar according to claim 18, wherein, the pad (101) is fixed on a supporting seat (102).

20. A tri-fold semi-embedded cover with lock for a front bar according to anyone of claims 1-4, wherein, the first rotating shaft system (3) and/or the second rotating shaft system (5) are connected to a locking system (4).

21. A tri-fold semi-embedded cover with lock for a front bar according to claim 12, wherein, both ends of the first profile (103) and the second profile (104) are connected to a large front bar joint (105), the large front bar joint (105) is provided with a first plug (1051), a second plug (1052) and a third plug (1053), the first profile (103) is provided with a first insertion hole (1035) and a second insertion hole (1034), the second profile (104) is provided with a third insertion hole (1045), the first plug (1051) is provided in correspondence with the first insertion hole (1035), the second plug (1052) is provided in correspondence with the second insertion hole (1034), the third plug (1053) is provided in correspondence with the third insertion hole (1045).

* * * * *